United States Patent
Walsh et al.

(10) Patent No.: US 12,541,392 B2
(45) Date of Patent: Feb. 3, 2026

(54) APPARATUS AND METHODS FOR A MISSION CRITICAL OPERATING ENVIRONMENT CONTAINER ARCHITECTURE

(71) Applicant: Parry Labs, LLC, Alexandria, VA (US)

(72) Inventors: David Walsh, Alexandria, VA (US); Charles Adams, Alexandria, VA (US)

(73) Assignee: Parry Labs, LLC, Alexandria, VA (US)

( * ) Notice: Subject to any disclaimer, the term of this patent is extended or adjusted under 35 U.S.C. 154(b) by 31 days.

(21) Appl. No.: 18/443,540

(22) Filed: Feb. 16, 2024

(65) Prior Publication Data

US 2025/0265105 A1 Aug. 21, 2025

(51) Int. Cl.
*G06F 9/455* (2018.01)
*G06F 9/50* (2006.01)

(52) U.S. Cl.
CPC ........ *G06F 9/45558* (2013.01); *G06F 9/5005* (2013.01); *G06F 2009/45583* (2013.01)

(58) Field of Classification Search
CPC ............... G06F 9/45558; G06F 9/5005; G06F 2009/45583
See application file for complete search history.

(56) References Cited

U.S. PATENT DOCUMENTS

| | | | |
|---|---|---|---|
| 9,075,638 B2 | 7/2015 | Barnett | |
| 9,851,998 B2 * | 12/2017 | Cochran | G06F 9/5077 |
| 10,572,226 B2 | 2/2020 | Biskup | |
| 11,360,844 B1 * | 6/2022 | Dodsley | G06F 11/1438 |
| 11,487,591 B1 * | 11/2022 | Featonby | G06F 9/45558 |
| 11,544,094 B2 | 1/2023 | Starks | |
| 2018/0294962 A1 * | 10/2018 | Kraemer | H04L 9/3221 |
| 2020/0311617 A1 * | 10/2020 | Swan | G06F 9/45558 |
| 2021/0004275 A1 * | 1/2021 | Avagyan | G06F 11/3409 |
| 2023/0259408 A1 * | 8/2023 | Grushka | G06F 9/505 718/105 |
| 2024/0095079 A1 * | 3/2024 | Kumar | G06F 9/5011 |
| 2025/0085996 A1 * | 3/2025 | Suman | G06F 21/602 |

\* cited by examiner

*Primary Examiner* — Jacob D Dascomb
(74) *Attorney, Agent, or Firm* — Caldwell Intellectual Property Law

(57) ABSTRACT

An apparatus having a mission critical operating environment container architecture includes a plurality of processor cores incorporated in at least a computing device and a memory communicatively connected thereto and containing instructions configuring at least a to deploy an operating system on the computing device, configured to receive a software module to be executed on the at least one multi-core processor, determine an initial resource allocation for the software model, wherein the initial resource allocation includes a memory allocation, create a virtual environment for the at least a software module by generating a virtualization layer and allocating a memory space through the virtualization layer in the memory according to the memory allocation, integrate the software module into the virtual environment by instantiating the software module into at least one software container, wherein the at least one software container comprises a plurality of dedicated software packages, and execute the container.

18 Claims, 7 Drawing Sheets

APPARATUS AND METHODS FOR A MISSION CRITICAL OPERATING ENVIRONMENT CONTAINER ARCHITECTURE

FIELD OF THE INVENTION

The present invention generally relates to the field of virtualization technology. In particular, the present invention is directed to an apparatus and methods for a mission critical operating environment.

BACKGROUND

Computing devices ordinarily manage resource allocation using operating systems according to standardized protocols for memory access and prioritization of instructions. However, this can be inadequate where particular tasks or objectives are particularly crucial.

SUMMARY OF THE DISCLOSURE

In an aspect, an apparatus having a mission critical operating environment container architecture includes a plurality of processor cores incorporated in at least a computing device and a memory communicatively connected to the plurality of processor cores, the memory containing instructions configuring at least a core of the plurality of processor cores to deploy an operating system on the computing device, the operating system configured to receive a software module to be executed on the at least one multi-core processor, determine an initial resource allocation for the software model, wherein the initial resource allocation includes a memory allocation, create a virtual environment for the at least a software module, wherein creating the virtual environment further comprises generating a virtualization layer and allocating a memory space through the virtualization layer in the memory according to the memory allocation, integrate the software module into the virtual environment by instantiating the software module into at least one software container, wherein the at least one software container comprises a plurality of dedicated software packages, and execute the container.

In another aspect, a method of providing a mission critical operating environment container architecture includes deploying, by at least a processor core of a plurality of processor cores communicatively connected to a memory, an operating system on the computing device, the operating system configured to receive a software module to be executed on the at least one multi-core processor, determine an initial resource allocation for the software model, wherein the initial resource allocation includes a memory allocation, create a virtual environment for the at least a software module, wherein creating the virtual environment further comprises, generating a virtualization layer, and allocating a memory space through the virtualization layer in the memory according to the memory allocation, integrating, by the at least a processor core the software module into the virtual environment by instantiating the software module into at least one software container, wherein the at least one software container comprises a plurality of dedicated software packages, and executing, by the at least a processor core, the software container.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, embodiments described herein generate and deploy a mission critical environment on a computing system having a plurality of processor cores and a connected memory. Mission critical deployment may be performed accounting for operational requirements of a software module to be operated in virtual environment, and allocation of resources to achieve those requirements.

Figure 1:
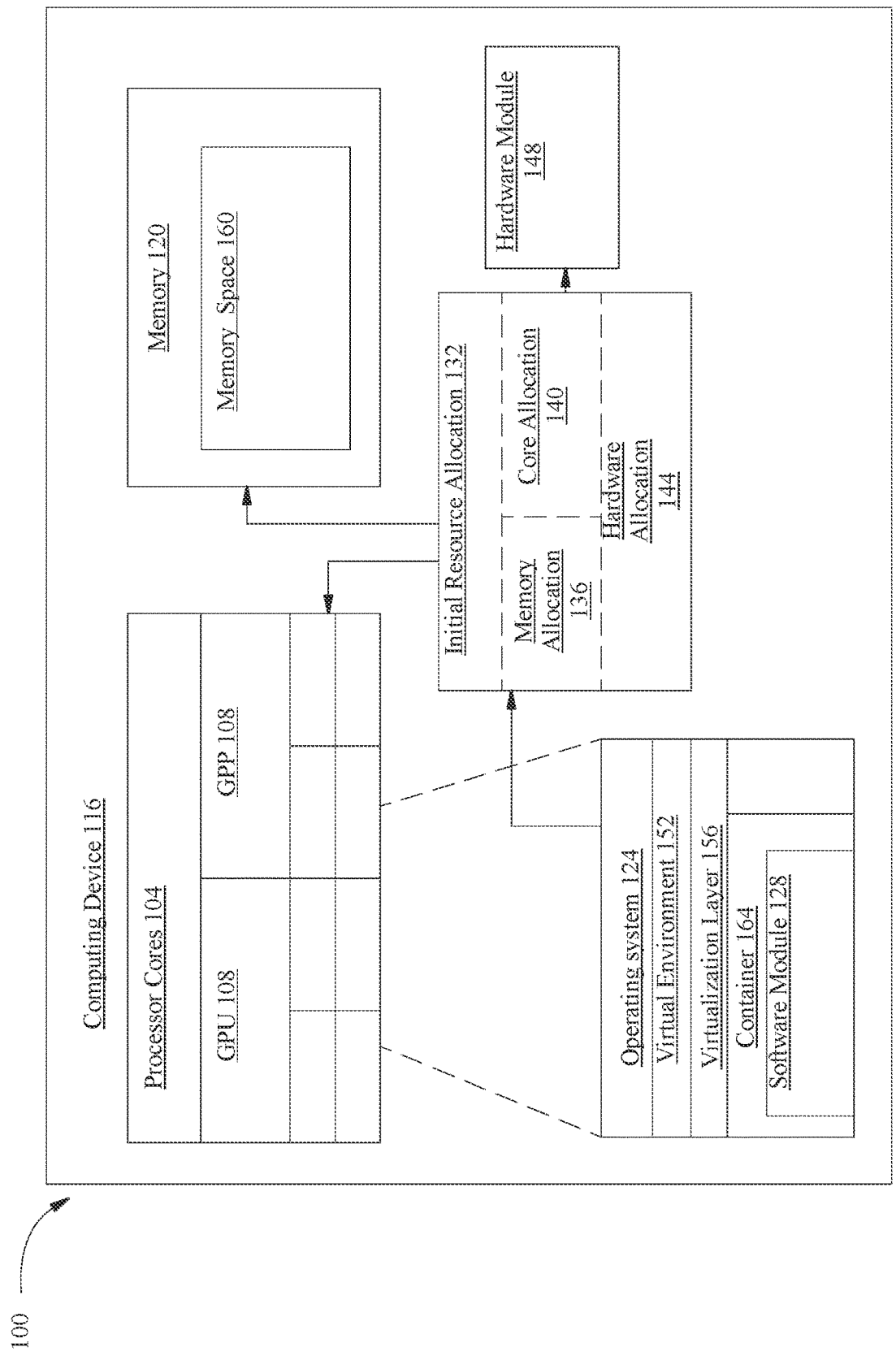
FIG. 1 is a block diagram of an exemplary embodiment of an apparatus for providing a mission critical operating environment container architecture.

Referring now to FIG. 1, an exemplary embodiment of an apparatus 100 having a mission critical operating environment container 164 architecture is illustrated. Apparatus 100 includes a plurality of processor cores 104 incorporated in at least a computing device 116, which may be incorporated in at least a graphical processing unit 108 and/or at least a general purpose processor 112. In one or more embodiments, a processor may include a multi-core processor. In one or more embodiments, multi-core processor may include multiple processor cores and/or individual processing units. "Processing unit" for the purposes of this disclosure is a device that is capable of executing instructions and performing calculations for a computing device 116. In one or more embodiments, processing unit be included within a processor, a core of a processor, an FPGA IP core such as picoblaze, and the like. In one or more embodiments, processing units may retrieve instructions from a memory 120, decode the data, secure functions and transmit the functions back to the memory 120. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiment, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory 120 wherein memory 120 may be retrieved from cache memory 120 for retrieval of data. In one or more embodiments, processing unit may include a clock register wherein the clock register is configured to synchronize the processor with other computing components. In one or more embodiments, a processor may include more than one processing units having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU is configured to handle arithmetic operations with floating point numbers. In one or more embodiments, a processor may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, a processor may include a plurality of multi-core processors.

Still referring to FIG. 1, apparatus includes a memory 120 communicatively connected the plurality of cores. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device 116. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, computing device 116 may include any computing device 116 as described in this disclosure, including without limitation a microcontroller, microprocessor, digital signal processor (DSP) and/or system on a chip (SoC) as described in this disclosure. computing device 116 may include, be included in, and/or communicate with a mobile device such as a mobile telephone or smartphone. computing device 116 may include a single computing device 116 operating independently or may include two or more computing device 116 operating in concert, in parallel, sequentially or the like; two or more computing devices 116 may be included together in a single computing device 116 or in two or more computing devices 116. computing device 116 may interface or communicate with one or more additional devices as described below in further detail via a network interface device. Network interface device may be utilized for connecting computing device 116 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices 116, and any combinations thereof. A network may employ a wired and/or a wireless mode of communication. In general, any network topology may be used. Information (e.g., data, software etc.) may be communicated to and/or from a computer and/or a computing device 116. computing device 116 may include but is not limited to, for example, a computing device 116 or cluster of computing devices 116 in a first location and a second computing device 116 or cluster of computing devices 116 in a second location. Computing device 116 may include one or more computing devices 116 dedicated to data storage, security, distribution of traffic for load balancing, and the like. computing device 116 may distribute one or more computing tasks as described below across a plurality of computing devices 116 of computing device 116, which may operate in parallel, in series, redundantly, or in any other manner used for distribution of tasks or memory 120 between computing devices 116. computing device 116 may be implemented, as a non-limiting example, using a "shared nothing" architecture.

With continued reference to FIG. 1, computing device 116 may be designed and/or configured to perform any method, method step, or sequence of method steps in any embodiment described in this disclosure, in any order and with any degree of repetition. For instance, computing device 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, memory 120 contains instructions configuring at least a core of the plurality of processor cores 104 to deploy an operating system 124 on the computing device 116. Operating system 124 is configured to receive a software module 128 to be executed on the at least one processor core. An "operating system 124," as used in this disclosure, is a software program that manages and coordinates hardware and software resources on a computing device 116, including coordination of memory allocation 136, instructions for processors and/or processor cores, and the like.

With further reference to FIG. 1, in or more embodiments, apparatus 100 may implement one or more aspects of Future Airborne Computing Environment (FACE). As used in this disclosure, a "Future Airborne Computing Environment" is a technical standard and business strategy for promoting acquisition of open systems software architecture in aviation industry, specifically for military avionics system. In some cases, apparatus 100 may employ FACE approach, wherein a computing device 116 may run in a common operating environment to support one or more portable capability software applications across a plurality of department of defense (DoD) avionics systems. In some cases, FACE may include a plurality of software application programming interfaces (APIs) grouped into "segments." In a non-limiting example, FACE may include operating system 124 segments (OSS), platform specific services segment (PSSS), I/O service segment, transport services segment, and/or the like. In some cases, FACE may provide a bounding box around software items and APIs, i.e., FACE Boundary. In some cases, apparatus 100 may include one or more extensions to FACE that satisfy safety assumptions in hardware outside FACE Boundary. In a non-limiting example, FACE may include a plurality of API groups (i.e., segments), wherein one or more API groups may be dependencies for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. In a non-limiting example, FACE may include a health monitoring monitor, interface hardware such as Ethernet device driver (within operating system 124 segment) configured to infer specific hardware assumptions.

With continued reference to FIG. 1, apparatus 100 may include a host circuit. Host circuit may include at least a processor communicatively connected to a memory 120. As used in this disclosure, a "host circuit" is an integrated circuit or a collection of interconnected circuits designed to manage, control, and/or interface with one or more functionalities in an apparatus 100. In a non-limiting example, host circuit may be configured as a primary platform or base that provides essential infrastructure, resources, and interfaces to facilitate the operation of other connected or integrated components. Hosting circuit may include any computing device 116 as described in this disclosure, including without limitation a microcontroller, microprocessor, digital signal a processor (DSP) and/or apparatus 100 on a chip (SoC) that provide one or more services, resources, or data to other computing devices 116. Host circuit may include, be included in, and/or communicate with a mobile device such as a mobile telephone or smartphone. Host circuit may include a single computing device 116 operating independently or may include two or more computing device 116 operating in concert, in parallel, sequentially or the like; two or more computing devices 116 may be included together in a single computing device 116 or in two or more computing devices 116. In some cases, host circuit may include but is not limited to, for example, a computing device 116 or cluster of computing devices 116 in a first location and a second computing device 116 or cluster of computing devices 116 in a second location. In other cases, host circuit may include a main unit or a primary circuit in a network that controls communications and/or provide a central point of interface.

Still referring to FIG. 1, apparatus is configured to determine an initial resource allocation 132 for the software model. An "initial resource allocation 132," as used in this disclosure, is an assignment and/or allocation of hardware resources such as processors, memory 120, and/or hardware modules 148 for use by one or more software modules 128 as described in further detail below. An initial resource allocation 132 may be designed and/or configured to provide resources to achieve one or mor operational and/or computational goals, for instance and without limitation as described below. Initial resource allocation 132 may include a memory allocation 136, defined as an allocation of memory 120 for a software module 128; memory 120 allocated may include dynamically, statically, and/or randomly allocated memory 120, including registers, random-access memory 120, and/or any form of persistent memory 120 as described in this disclosure. Initial resource allocation 132 further comprises a core allocation 140, defined as selection of one or more processor cores to be used in a virtual environment 152 and/or for operation of a software module 128. A core allocation 140 may include at least a first core in a first processor and at least a second core in a second processor; for instance, one or more GPP 112 cores and/or GPP 112 cores and/or tensor cores may be required, useful, and/or instructed as necessary for performance of one or more tasks. As a non-limiting example, one or more GPU 108 cores and/or tensor cores may be used for highly parallel tasks such as matrix calculations, cryptographic and/or machine-learning or machine-learning training operations, video processing, or the like, while other tasks more amenable to flexibility of instruction sets or the like may be implemented using GPP 112 cores. Initial resource allocation 132 may include a hardware allocation 144, defined as allocation and/or assignment of one or more peripheral, integrated, and/or communicatively connected hardware modules 148 and/or circuit elements, including without limitation any elements and/or modules that may be implemented on and/or with an FPGA and/or application-specific integrated circuit (ASIC); such hardware elements may include without limitation peripheral connections to sensors, analog to digital converters, digital to analog converters, serial to parallel converters, parallel to serial converters, signal processing units such as without limitations digital and/or analog filters, waveform generators, or the like, cryptographic units, and/or any other hardware element that may occur to persons skilled in the art upon reviewing the entirety of this disclosure.

Further referring to FIG. 1, determination of initial resource allocation 132 may be accomplished by receiving an instruction specifying the initial resource allocation 132. For instance, software module 128 may include instructions within and/or packaged with software module 128 indicating an allocation of resources, such as a number of cores, a number of GPP 112 cores, a number of GPU 108 cores, a number of hardware modules 148 of one or more types, an amount of primary memory 120 and/or secondary memory 120, or the like. Alternatively or additionally, at least a processor core and/or operating system 124 may determine initial resource allocation 132 by identifying a maximal performance requirement and determining the initial resource allocation 132 based on the maximal performance requirement. A "maximal performance requirement," as used herein, is a maximum amount of a given computer resource that will be required to achieve an operational and/or computational objective of a software module 128 under "worst case" analysis. For instance, and without limitation, a maximal computational requirement may include a maximum number of clock cycles, instructions, or the like, for instance as calculated using "big O" notation, to perform a given algorithm for a software module 128; maximum computational requirement may also include a number of instructions and/or clock cycles that must be performed on one or more processors in a given amount of time to perform a given operation within the time required to do so, which might be established by a user instruction and/or instruction included with, packaged with, and/or embedded in software module 128 that specifies a required response time, frame rate, or the like for a given algorithm and/or step. A maximal performance requirement may alternatively or additionally include a maximal memory 120 requirement, defined as a maximal performance requirement that identifies a maximal amount of memory 120 needed to support a given algorithm and/or operational requirement; as an illustrative example, a maximal memory 120 requirement may include an amount of cache space, an amount of RAM or other primary memory 120, an amount of virtual memory 120, and/or an amount of secondary and/or persistent memory 120 that will be required under worst-case analysis to meet a requirement for performance of software module 128 and/or one or more algorithms thereof, which may be specified in any manner as described above for maximal computational requirements.

Alternatively or additionally, and still referring to FIG. 1, at least a processor core and/or operating system 124 may determine initial resource allocation 132 by identifying a probable performance requirement and determining the initial resource allocation 132 based on the probable performance requirement. A "probable performance requirement," as used herein, is a maximum amount of a given computer resource that will be required to achieve an operational and/or computational objective of a software module 128 under a most likely or most probable use of resources. For instance, and without limitation, a probable computational requirement may include a probable number of clock cycles, instructions, or the like, for instance as calculated using "big O" notation, to perform a given algorithm for a software module 128; probable computational requirement may also include a number of instructions and/or clock cycles that must be performed on one or more processors in a given amount of time to perform a given operation within the time required to do so, which might be established by a user instruction and/or instruction included with, packaged with, and/or embedded in software module 128 that specifies a required response time, frame rate, or the like for a given algorithm and/or step. In some embodiments, initial resource allocation 132 may be based on a padded probable resource requirement, which may, for instance, allocate computational and/or memory 120 resources sufficient for a probable requirement plus an additional amount to account for potentially worse computation and/or memory 120 use than in the most probable case. A probable performance requirement may alternatively or additionally include a probable memory 120 requirement, defined as a probable performance requirement that identifies a probable amount of memory 120 needed to support a given algorithm and/or operational requirement; as an illustrative example, a probable memory 120 requirement may include an amount of cache space, an amount of RAM or other primary memory 120, an amount of virtual memory 120, and/or an amount of secondary and/or persistent memory 120 that will be required under worst-case analysis to meet a requirement for performance of software module 128 and/or one or more algorithms thereof, which may be specified in any manner as described above for probable computational requirements.

Alternatively or additionally, and with further reference to FIG. 1, determining initial resource allocation 132 may include identifying a redundancy requirement and determining the initial resource allocation 132 based on the redundancy requirement. A "redundancy requirement," as used in this disclosure, is an amount of computational and/or memory 120 resources required and/or usable to build redundancy into resources to be allocated for a software module 128, virtual environment 152, or the like. For instance, a redundancy requirement may specify that two copies of certain data to be stored in memory 120 must be stored, so that if one copy becomes corrupted or otherwise compromised a second copy may be used instead of the first copy and/or to repair correct errors therein; as a non-limiting example, each memory 120 word or other allotment may have a certain allocation of bits for error correction and/or error correction code storage and/or implementation, and redundant copies may provide ability to replace a give data word, sector, or the like with one that has no detected error, effectively increasing error correction abilities. Initial resource allocation 132 may be performed according to either or both of a maximal performance requirement and a redundancy requirement.

Further referring to FIG. 1, performance requirements and/or redundancy requirements may be calculated by apparatus 100, for instance and without limitation based on source code and/or compiled code for software module 128, combined with one or more user-entered and/or otherwise received performance objectives. This may be performed, without limitation, using a machine-learning model such as without limitation a neural network, that may be trained by apparatus and/or on another device and then deployed or instantiated on apparatus 100. Training data may include samples, elements, functions, data structures, or the like in source code, compiled, and/or other form correlated with measured and/or simulated run times, memory 120 usages, or the like, which may be used to train a model and/or neural network to predict probable performance, maximal performance, or the like as described above. Alternatively or additionally, any of the above performance and/or redundancy requirements may be user-entered and/or received in and/or with software module 128.

Still referring to FIG. 1, deployment of the operating system 124 may include performing an attested boot of operating system 124. Apparatus 100 may be configured to perform one or more cryptographic processes and/or instantiate one or more cryptographic primitives, for instance and without limitation as described below.

With continued reference to FIG. 1, software container 164, virtual template, virtual package and/or virtual container 164 (which collectively be known henceforth as "application programs") may be encrypted, password protected, digitally signed and the like to preserve the trustworthiness and/or the integrity of software programs. In an embodiment, methods and systems described herein may perform or implement one or more aspects of a cryptographic apparatus. In one embodiment, a cryptographic apparatus is an apparatus that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic apparatus may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic apparatus wishes to be able to decrypt the ciphertext. One example of a symmetric cryptographic apparatus is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic apparatus," in which possession of the encryption key does not make it practically feasible to deduce the decryption key, so that the encryption key may safely be made available to the public. An example of a public key cryptographic apparatus is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2n/2)$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic apparatus is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic apparatus, a prover runs a proving algorithm using the proving key and secret information available to the prover, and a verifier checks the proof using the verification key; public key cryptographic apparatus may include RSA, elliptic curve cryptography, ElGamal, or any other suitable public key cryptographic apparatus. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic apparatus or using a private key of a symmetric cryptographic apparatus; for instance, trusted party may verify response by decrypting an encryption of challenge or of another datum using either a symmetric or public-key cryptographic apparatus, verifying that a stored key matches the key used for encryption as a function of at least a device-specific secret. Keys may be generated by random variation in selection of prime numbers, for instance for the purposes of a cryptographic apparatus such as RSA that relies prime factoring difficulty. Keys may be generated by randomized selection of parameters for a seed in a cryptographic apparatus, such as elliptic curve cryptography, which is generated from a seed. Keys may be used to generate exponents for a cryptographic apparatus such as Diffie-Helman or ElGamal that are based on the discrete logarithm problem.

Keys may be generated by random variation in selection of prime numbers, for instance for the purposes of a cryptographic apparatus such as secret that relies prime factoring difficulty. Keys may be generated by randomized selection of parameters for a seed in a cryptographic apparatus, such as elliptic curve cryptography, which is generated from a seed. Keys may be used to generate exponents for a cryptographic apparatus such as Diffie-Helman or ElGamal that are based on the discrete logarithm problem.

Cryptographic apparatus may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory 120 that may be overwritten and/or corrupted.

An "attested boot" for the purposes of this disclosure is system that verifies the reliability of a boot sequence to ensure that an operating system 124 and its own components have not been tampered with. In one or embodiments, computing device 116 may check various digital signatures associated with the kernel, bootloader, operating system 124 and the like to ensure that a virtual machine and/or operating system 124 has not been tampered with or compromised. In one or more embodiments, a system such as computing device 116 may refuse to boot the underlying software of the software cannot be verified. In one or more embodiments, computing device 116 and/or hypervisor may be configured to verify a compliance of the software module 128 with a plurality of pre-determined safety standards sourced from a trusted repository by monitoring an adherence of the software module 128 to a pre-defined operational rule within a non-preemptible container 164 runtime. As used in this disclosure, a "compliance" is a data element measuring a conformance of software module 128 to established guidelines or specifications designed to ensure the safety and reliability of software module 128 (especially within environment where failure may lead to significant harm or loss) known as "safety standards." In some cases, compliance may include a quantitative value such as a score or a range of scores. In other cases, compliance may include one or more binary representation, for example, "1" and "0" or "TRUE" and "FALSE," wherein "1/TRUE" may indicate software module 128 is compliant with at least one corresponding safety standard and "0/FALSE" may indicate software module 128 is non-compliant with the at least one corresponding safety standard. A "trusted repository," for the purpose of this disclosure, is a trust entity e.g., a secure storage or even a trusted (third) partition, wherein plurality of safety standards are kept. In a non-limiting example, trust repository may be considered authoritative and tamper-proof e.g., one or more secure databases, version control systems, and/or certified data centers. In an embodiment, computing device 116 may be configured to evaluate compliance to ensure that software module 128 may perform all functions specified to at least one operational rule. In a non-limiting example, computing device 116 may be configured to determine a design assurance level classification (DAL) associated with software module 128 design assurance level classification (DAL) based on container 164 runtime behaviors observed by container 164 agent or a record generated and managed by logging mechanism (in real-time or near real-time). In one or more embodiments, a hypervisor may measure various data such as software module 128, software container 164 and the like wherein changes to data size and the like may indicate that a software may have been compromised. In one or more embodiments, inputs and/or outputs of software module 128 may be digitally signed wherein data not containing a digital signature may indicate that software module 128 may be compromised. In one or more embodiments, virtual machine and/or data within virtual machine may be digitally signed wherein an absence of a digital signature may indicate that the system has been compromised.

A "digital signature," as used herein, includes a secure proof of possession of a secret by a signing device, as performed on provided element of data, known as a "message." A message may include an encrypted mathematical representation of a file or other set of data using the private key of a public key cryptographic apparatus. Secure proof may include any form of secure proof as described above, including without limitation encryption using a private key of a public key cryptographic apparatus as described above. Signature may be verified using a verification datum suitable for verification of a secure proof; for instance, where secure proof is enacted by encrypting message using a private key of a public key cryptographic apparatus, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic apparatus. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, software programs may include a time-varying software programs, which may have a time limit after which time-varying software programs is no longer valid. Time limit may be calculated from an initial time, which may be a datum linked to a particular timestamp or other value representing a fixed moment in time, associated with time-varying software programs; initial time may be a time of creation, a time of verification, or other significant time relating to validity of time-varying token. Initial time may include, without limitation, a timestamp, which may include a secure timestamp, and/or a datum linked to a secure timestamp, such as a cryptographic hash of the secure timestamp or the like. As used herein, a "secure timestamp" is an element of data that immutably and verifiably records a particular time, for instance by incorporating a secure proof, cryptographic hash, or other process whereby a party that attempts to modify the time and/or date of the secure timestamp will be unable to do so without the alteration being detected as fraudulent.

Still referring to FIG. 1, secure timestamp may record the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using software programs. Additional data may include one or more additional data, including data, that are received, generated, identified, and/or determined by a processor. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted time-stamped data back to the listener device. Alternatively, or additionally, one or more additional participants, such as other verifying nodes, may evaluate secure timestamp, or other party generating secure timestamp and/or perform threshold cryptography with a plurality of such parties, each of which may have performed an embodiment of method to produce a secure timestamp. In an embodiment, a data store, or other parties authenticating digitally signed assertions, devices, and/or user credentials may perform authentication at least in part by evaluating timeliness of entry and/or generation data as assessed against secure timestamp. In an embodiment, secure proof is generated using an attested computing protocol; this may be performed, as a non-limiting example, using any protocol for attested computing as described above.

With continued reference to FIG. 1, additionally, or alternatively, software programs may be encrypted, by host operating system 124 acting on a first partition prior to the transmission. In one or more embodiment, host operating system 124 may implement one or more aspects of a cryptographic apparatus, wherein the cryptographic is an apparatus 100 that converts data e.g., software programs, from a first form, known as "plaintext," which is intelligible when viewed in its intended format, into a second form, known as "ciphertext," which is not intelligible when viewed in the same way. In some cases, software programs may be unintelligible in any format unless first converted back to plaintext. Such process of converting plaintext into ciphertext is known as "encryption." In some cases, encrypting software programs may include the use of a datum, such as an "encryption key," to alter plaintext software programs. In some cases, at least a processor (and host operating system 124) may convert ciphertext back into plaintext, which is a process known as "decryption." At least a processor may be configured to decrypt software programs upon receipt. Decrypting software programs may include the use of another datum, such as a "decryption key," to return the ciphertext to original plaintext form. In some embodiments, cryptographic apparatus implemented by host operating system 124 may include a "symmetric cryptographic apparatus," wherein the decryption key may be essentially the same as encryption key. In a non-limiting example, possession of either key may make it possible to deduce the other key quickly without further secret knowledge. In some cases, encryption and decryption keys in symmetric cryptographic systems may be kept secret and shared only with trusted entities such as, without limitation, trusted partitions and/or at least a processor. In a non-limiting example, host operating system 124 may include an Advanced Encryption Standard ("AES"), which arranges software programs into matrices and then modifies the matrices through repeated permutations and arithmetic operations with an encryption key.

With continued reference to FIG. 1, in some cases, host operating system 124 may include an asymmetric cryptographic apparatus, wherein either encryption or decryption key cannot be readily deduced without additional secret knowledge, even given the possession of a corresponding decryption or encryption key, respectively. In a non-limiting example, host operating system 124 may implement a "public key cryptographic apparatus," in which possession of the encryption key does not make it practically feasible to deduce the decryption key, so that the encryption key may safely be made available to the public e.g., all partitions within virtual environment 152. In some cases, public key cryptographic apparatus may include RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. In some cases, host operating system 124 may employ an elliptic curve cryptography, wherein the elliptic curve cryptography may rely on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in some cases, software programs may be configured to initiate an encrypted handshake between two partitions or between a partition and an external apparatus 100, wherein such handshake may involve an exchange of one or more encrypted messages to verify the identity of parties involved. In a non-limiting example, host operating system 124a may send software programs to at least a processor to initiate a secure connection with a second partition as described in detail below using transport layer security (TLS) protocol, wherein both partitions prove their identities to each other using encrypted keys. In some cases, software programs may specify that data stored or transmitted by one or more partitions should be encrypted using AES as described above. In a non-limiting example, software programs may dictate that any data saved to disk by one or more partition must be encrypted with AES-256 key. Only parties with the decryption key may transform the ciphertext back into plaintext when reads. In some cases, when two different keys are involved, one or more partitions may use private keys to decrypt messages encrypted with corresponding public keys.

With continued reference to FIG. 1, in one or more embodiments, at least a processor may be configured to verify the integrity of data or to ensure that software programs hasn't been tampered with using cryptographic hashes, also referred to by the equivalent shorthand term "hashes." A cryptographic hash, as used herein, is a mathematical representation of data, such as software programs and data thereof, wherein the mathematical representation is produced by a lossy "one-way" algorithm known as a "hashing algorithm." In some cases, hashing algorithm may be a repeatable process; that is, identical data may produce identical hashes each time they are subjected to a particular hashing algorithm. Since hashing algorithm is a one-way function, it may be impossible to reconstruct a lot of data from a hash produced from the lot of data using the hashing algorithm. In some cases, hashing algorithm may include one or more processes that reconstruct the full data from the corresponding hash using a partial set of data from the full data may be possible only by repeatedly guessing at the remaining data and repeating the hashing algorithm; it is thus computationally difficult if not infeasible for a single computer to produce the data, as the statistical likelihood of correctly guessing the missing data may be extremely low. In a non-limiting example, when software programs is sent, a SHA-256 hash of the request may be generated and sent alongside. At least a processor or receiving partition may hash the received configuration request using the same algorithm and check if the hashes match to verify the data integrity.

With continued reference to FIG. 1, a processor may be configured to display each virtual environment 152 on a single display screen. "Display Screen" for the purposes of this disclosure is a device configured to show visual information. In some cases, display screen may include a liquid crystal display (LCD), a cathode ray tube (CRT), a plasma display, a light emitting diode (LED) display, and any combinations thereof. Display device may include, but is not limited to, a smartphone, tablet, laptop, monitor, tablet, and the like. Display screen may include a separate device that includes a transparent screen configured to display computer generated images and/or information. In some cases, display screen may be configured to visually present one or more data through a graphical user interface to a user, wherein a user may interact with the data through the graphical user interface. In one or more embodiments, one or more virtual environments 152 may be projected simultaneously on display screen. In one or more embodiments, each portion of display screen may visually display virtual environment 152, wherein multiple virtual environments 152 may exist on a singular display screen. In one or more embodiments, each virtual environment 152 may be accessed through one or more remote software as described above, wherein the remote software may display virtual environment 152. In one or more embodiments, remote software may allow for display of multiple virtual environments 152 on single display screen. In one or more embodiments, virtual environments 152 may be running simultaneously on hypervisor. In one or more embodiments, host operating system 124 and virtual environments 152 may exist on hypervisor wherein host operating system 124 and virtual environments 152 may be performing different processes and/or actions. In one or more embodiments, hypervisor may include one or more remote software that may allow for access to one or more virtual environments 152 on single display screen. In one or more embodiments, remote software may allow for visualization of multiple virtual environment 152 on single display screen.

With continued reference to FIG. 1, in one or more embodiments, computing device 116 may be configured to initiate a secure boot process when the apparatus 100, in some cases, is powered on or restarted. In some cases, computing device 116 may include a trusted platform module (TPM), wherein the "trusted platform module," for the purpose of this disclosure, is a specialized chip on an endpoint hardware component (i.e., device) that store keys e.g., cryptographic keys such as encryption keys, decryption keys, public keys, private keys, or any key as described herein. In a non-limiting example, computing device 116 may include a plurality of TPMs, each containing an RSA key pair known as "Endorsement key (EK)," wherein the RSA key pair may be maintained inside of a TPM and cannot be accessed by software module 128. In some cases, a first partition may include a bootloader (i.e., the first piece of software that runs). In some cases, bootloader may be verified, for example, one or more apparatus 100 firmware may be configured to check bootloader's digital signature before execution using keys e.g., public keys stored in TPM or another secure component. In case where bootloader's signature doesn't match, computing device 116 may halt, preventing potential malicious partitions from running. Once bootloader is verified and executed, hypervisor may be instantiated as described above. In some cases, hypervisor may also be verified through an associated digital signature to ensure its authenticity. In a non-limiting example, computing device 116 may boot only with trusted and authenticated partitions e.g., a primary partition and plurality of child partitions. Child partitions be verified before loading, or trusted version of second partition may be loaded. Hypervisor may be configured to prevent any child partition that yield a negative response during verification. In some cases, all events during the secure boot process as described herein, including, without limitation, any verification failures or anomalies, can be communicated to primary partition through virtual bus. In some cases, these events may be alerted to certain users e.g., administrators. Additionally, or alternatively, in cases where verification fails, computing device 116 may be configured to boot into a safe mode, attempting to restore a trusted software version, or simply halting at least a processor and/or primary partition to prevent potential threats.

With continued reference to FIG. 1, at least a processor core and/or operating system 124 may be configured to create a virtual environment 152 for the at least a software module 128. In an embodiment, creating virtual environment 152 may include generating a virtualization layer 156 and allocating a memory 120 space through the virtualization layer 156 in the memory 120 according to the memory allocation 136. Operating system 124 and/or at least a processor core may be configured to provide the virtual environment 152 with direct access to one or more physical hardware components of the at least a computing device 116.

"Virtual environment 152" for the purposes of this disclosure is a self-contained environment within a computing device 116 that allows for the isolation of one or more software from the host operating system 124. For example, and without limitation, a virtual environment 152 may include a separate and isolated operating system 124 on computing device 116 that does not interact with the host operating system 124. In one or more embodiments, virtual environment 152 may include an environment located on a virtual machine. Host operating system 124 includes a primary operating system 124 installed on a computing device 116 hardware. In some cases, host operating system 124 may manage underlaying physical resources and facilitate the running of one or more guest operating systems 124 (guest OS). In a non-limiting example, Linux operating system 124 running on computing device 116 as the primary operating system 124 may be the host operating system 124. Software applications integrated to computing device 116 as described herein may be run atop Linux operating system 124. In some cases, virtual environment 152 may be software-defined, for example, and without limitation, virtual environment 152 may include a simulated operating system 124 that operates independently of the underlaying physical hardware of computing device 116. In some cases, virtual environment 152 may emulate one or more hardware, software, networks, or a combination thereof. In a non-limiting example, a plurality of partitions may be allocated inside of virtual environment 152, wherein each partition may include a virtual machine (VM). "Virtual machine," for the purpose of this disclosure, is a software-based emulation of a computer system 100 that is capable of running one or more software applications as if they were running on physical hardware. For instance, and without limitation, virtual environment 152 may include a separate and isolated operating system 124 on computing device 116 that does not interact with host operating system 124.

In one or more embodiments, a virtual machine may be used to create and execute an operating system 124 that is separate and isolated from the host operating system 124. In one or more embodiments, virtual machine may allow for the creation of virtual environments 152. In one or more embodiments, generation of a virtual environment 152 may include allocation of memory 120 space on memory 120 on computing device 116. "Memory allocation 136" for the purposes of this disclosure is the process of reserving computer space for a particular purpose. In one or more embodiments, memory 120 may be allocated for generation of a virtual environment 152. In one or more embodiments, memory allocation 136 may be static wherein a predefined amount of space if reserved and cannot be modified. For example, and without limitation, in a static memory allocation 136, if a virtual environment 152 is given 2 gigabytes of memory 120, the memory 120 cannot be increased or decreased. In one or more embodiments, memory allocation 136 may be dynamic wherein memory 120 may be continuously increased based on the demands of the virtual environment 152. In one or more embodiments, memory 120 may be allocated in order to ensure that a virtual environment 152 contains the proper amount of space in order to perform its intended functions. In one or more embodiments, creation of a virtual environment 152 may include creation of a guest operating system 124 using virtual machine.

In one or more embodiments, memory allocation 136 may include a process of reserving memory 120 space on the host operating system 124 for use within the virtual environment 152. In one or more embodiments, memory allocation 136 may further include partitioning of memory 120 wherein the memory 120 may be portioned into more than one parts. In one or more embodiments, memory 120 may be partitioned into a root partition (also known as a parent partition) and one or more child partitions. The root partition may contain the operating system 124 while the child partitioning contain the virtual environments 152. In one or more embodiments, management of the child partitions may be done through the root partition. In one or more embodiments, computing device 116 may be configured to partition memory 120 into more than one or child partitions wherein each child partition may be associated with a separate software container 164. "Partition" for the purposes of this disclosure refers to a separated section of physical hardware on computing device 116. For example, and without limitation, a memory 120 may be split into several partitions wherein each partition may be used for separate and distinct storage tasks. In one or more embodiments, one or more various physical hardware components may be partitioned such as but not limited to a processor, a primary memory 120, a secondary memory 120, a network device and the like. In one or more embodiments, partitioning may include the use of disk management software and/or other partitioning software that may allow for the splitting of a physical hardware component into one or more separate partitions.

With continued reference to FIG. 1, virtual environment 152 may be created on host operating system 124. In one or more embodiments, in instances where virtual environment 152 is generated on a host operating system 124, the virtual environment 152 must communicate with the host operating system 124 to receive resources such as computing power, memory 120 space and the like. In one or more embodiments, one or more virtual environments 152 may be generated using a hypervisor. A "hypervisor" for the purposes of this disclosure is a software module 128 which is configured to create and manage virtual machines. In one or more embodiments, hypervisor may create one or more virtual machines wherein each virtual machine may host a separate and isolated virtual environment 152. In one or more embodiments, each virtual environment 152 may contain a separate and isolated operating system 124. In one or more embodiments, a hypervisor may run on the host operating system 124 wherein the hypervisor may generate virtual machines on the host operating system 124. In one or more embodiments, a hypervisor may run directly on the hardware of a computing device 116 without reliance on an operating system 124. In one or more embodiments, a hypervisor that runs independent of a host operating system 124 may be referred to as a "Type 1" and/or "bare metal" Hypervisor. In one or more embodiments, in a bare metal hypervisor, the hypervisor is directly installed on the hardware of computing device 116 rather than through the operating system 124. In one or more embodiments, a type 1 hypervisor may partition resources, such as memory 120 processing power and the like for each virtual machine. In one or more embodiments, virtual machines may communicate directly with the hardware of computing device 116 rather than the host operating system 124. In one or more embodiments, in a bare metal hypervisor virtual machines are not susceptible to issues caused by the host operating system 124 and/or other virtual machines. In one or more embodiments, virtual machines may be isolated and unaware that other virtual machines exist. In one or more embodiments, a bare metal hypervisor may allow for increased performance wherein virtual machines may communicate directly with hardware rather than through the intermediate host operating system 124. In one or more embodiments, a bare metal hypervisor may allow multiple virtual machines to run simulates wherein failure of one virtual machine may not result in a failure of a second virtual machine. In one or more embodiments, in a type 2 hypervisor, partitioning and resource allocation may occur above the host operating system 124 layer, whereas in a type 1 hypervisor partitioning may occur below the host operating system 124 and directly with the hardware of computing device 116. In one or more embodiments, in a type 2 hypervisor, virtual environments 152 may rely on the host operating system 124 for proper resource allocation and memory allocation 136 whereas in a type 1 hypervisor, virtual environments 152 may only rely on the hardware.

In one or more embodiments, hypervisor may include a software configured as a virtual machine monitor (virtual machines). In some cases, hypervisor may be configured to allow a physical machine (host) such as computing device 116 to run a plurality of operating systems 124 simultaneously by virtualizing system 100 hardware e.g., processors, memory 120, I/O devices, and/or the like. In a non-limiting example, hypervisor may create one or more virtual machines wherein each virtual machine may host a separate and isolated software operating environment (SOE). In some cases, hypervisor may run directly on the hardware of computing device 116 without reliance of an operating system 124. Instantiating hypervisor may include launching or initializing hypervisor in host operating system 124. In some cases, instantiation of hypervisor may create virtual environment 152 wherein a plurality of partitions (i.e., virtual machines) can be run and managed. In an embodiment, hypervisor may include a "type 1 hypervisor" that may run independently of host operating environment. In a non-limiting example, hypervisor may include a bare metal hypervisor that runs directly on the computing device 116 hardware and manages one or more quest operating systems 124. Exemplary type 1 hypervisor may include, without limitation, MICROSOFT HYPER-V, VMWARE ESXI, XEN, and/or the like. In some cases, virtual machines created by type 1 hypervisor may communicate directly with the hardware of computing device 116 rather than host operating system 124. In some cases, virtual machines created by type 1 hypervisor may not be susceptible to issues caused by the host operating system 124 and/or other virtual machines in virtual environment 152. In a non-limiting example, one or more virtual machines may be isolated and unaware of existence of other virtual machines. In an embodiment, type 1 hypervisor may allow for an increased performance wherein virtual machines within virtual environment 152 may communicate directly with hardware rather than through the intermediate host operating system 124. In a non-limiting example, type 1 hypervisor may allow one or more virtual machines to run simultaneously, wherein the failure of a first virtual machines may not result in a failure of a second virtual machines.

With continued reference to FIG. 1, in another embodiment, hypervisor may include a "type 2 hypervisor" that runs atop host operating system 124 similar to any other software applications. In one or more embodiment, hypervisor may include a hosted hypervisor having resource allocation occurred right above host operating system 124. In some cases, type 2 hypervisor may rely on host operating system 124 of computing device 116, whereas in type 1 hypervisor as described above, may only rely on the hardware of computing device 116. Exemplary type 2 hypervisor may include, without limitation, VMWARE WORKSTATION, ORACLE VIRTUAL BOX, and/or the like. In some cases, when instantiating type 2 hypervisor, processor may launch type 2 hypervisor that has been pre-installed similar to launching any software application. Once host OS is up and running, processor may then start type 2 hypervisor to create, manage and run virtual machines atop the host OS; however, for type 1 hypervisor, since it runs directly on "bare metal" (i.e., hardware without requiring an underlying operating system 124), instantiating type 1 hypervisor may involve booting the system 100 from a medium such as, without limitation, a USB drive, CD, or a network source containing hypervisor. Once booted, hypervisor may take control of at least a portion of hardware resources and manage and/or launch one or more virtual machines.

With continued reference to FIG. 1, processor may then generate a virtualization layer 156 supervised by hypervisor, wherein a host operating system 124 within virtual environment 152 is operated by the virtualization layer 156. As used in this disclosure, a "virtualization layer 156" is a software layer (or interface) that sits between hardware layer (e.g., physical CPU, memory 120, I/O devices, and/or the like) and virtual environment 152 having one or more virtual machines. In some cases, virtualization layer 156 may be configured to virtualize the underlaying hardware resources and present the virtualized hardware resources to plurality of virtual machines as though they are dedicated to each virtual machine. In a non-limiting example, a plurality of partitions of a single physical hardware component as described herein may share the same physical hardware resources through virtualization layer 156, without being aware of each other. In some cases, virtualization layer 156 may be instantiated when hypervisor is booted or launched. In a non-limiting example, in case of a type 1 hypervisor, virtualization layer 156 may be generated when machine starts up since hypervisor directly interface with hardware. In another non-limiting example, in case of a type 2 hypervisor, virtualization layer 156 may be established once hypervisor software is initiated on top of host OS. In some cases, hypervisor may be configured to monitor and manage one or more hardware abstraction and allocate these virtualized resources to designated virtual machines. In a non-limiting example, virtualized resources may include CPU time, memory 120 space, I/O operations and/or the like. In some cases, virtualized resources may be allocated based on partition policy as described in detail below. In some cases, hypervisor may manage the scheduling of virtual machines tasks on actual cores. In some cases, hypervisor may handle interruptions, exceptions, and any events that occur, deciding which virtual machines or service needs attention. In some cases, hypervisor may be configured to isolate one or more virtual machines from rest of virtual machines to maintain system 100 security and stability. In other cases, hypervisor may be configured to manage lifecycle operations of one or more virtual machines such as, without limitation, creation, modification, deletion, migration, and/or the like.

With continued reference to FIG. 1, in one or more embodiments, one or more physical hardware components of computing device 116 may be partitioned. In one or more embodiments, one partition of the plurality of partition may contain host operating system 124. In one or more embodiments, host operating system 124 may be used to manage hypervisor, instantiate virtual machines and the like. In one or more embodiments, host operating system 124 may operate on primary partition and/or a parent partition wherein virtual machines may operate on child partitions. In one or more embodiments, management of hypervisor may occur on host operating system 124. In one or more embodiments, one or more processes as described herein may occur on host operating system 124 prior to being implemented within child partitions.

With continued reference to FIG. 1, in a non-limiting example, when host operating system 124 is created, a pre-defined set of virtual hardware resources may be provided by virtualization layer 156, wherein the pre-defined set of virtual hardware resources may include, but is not limited to processor cores, portion of virtualized memory 120, virtual disks, virtual network interfaces, among others. As host operating system 124 attempts to execute one or more operations or access its "hardware," host operating system 124 may interface with virtualization layer 156, for instance, and without limitation, when virtual machine tries to use processor, it may be scheduled by hypervisor onto physical processor on computing device 116 through virtualization layer 156. In some cases, host operating system 124 may receive these resources as if they are dedicated hardware components, oblivious to the abstraction layer beneath. In some cases, virtualization layer 156 may handle I/O operations, translating virtual disk or network accesses to actual operations on the physical hardware. Any interruption, exception, or system 100 call made by host operating system 124 may be intercepted by virtualization layer 156 which then communicates with hypervisor to handle or service that request.

With continued reference to FIG. 1, in some cases, a plurality of partitions may include at least a dedicated partition, wherein one or more I/O operations may be consolidated into the at least a dedicated partition. In some cases, such partition may include a specialized virtual machine that is configured to manage and handle I/O operations for other virtual machines, acting as an intermediary between plurality of partitions and/or quest virtual machines and physical hardware resources through an I/O physical bus e.g., a virtualized PCI bus that connects devices to main system 100. In a non-limiting example, at least a dedicated partition may include a I/O virtual machine containing a plurality of FACE I/O service segments (IOSS), wherein each IOSS may provide a standardized interface between OSS and platform-specific hardware. I/O virtual machine may be configured to manage all I/O operations in adherence to FACE technical standards as described above. In a non-limiting example, through plurality of IOSS, I/O virtual machine may include a virtual machine that interface directly with platform's avionic hardware connected to computing device 116 in a way that is standardized across different air vehicles and systems. In some cases, standardized device drives and/or adapters may be provided by IOSS for various avionic devices. For example, when a quest virtual machine or a software application integrated into the system 100 as described below wants to access a hardware resources, it may be configured to indirectly communicate with the I/O virtual machine, plurality of IOSS having standardized drivers for the hardware may process the request as per pre-defined system 100 specification (e.g., FACE specification). In these cases, other partitions or virtual machines may be less susceptible to I/O-related faults or security breaches. Security protocols may be standardized and attach surface may be reduced by centralizing drivers and I/O operations since other virtual machines do not directly access I/O hardware, reducing potential vulnerabilities. In other cases, updates, or changes to one or more I/O device drivers or I/O related services may be done in I/O virtual machine without affecting or rebooting the rest of virtual machines.

With continued reference to FIG. 1, hypervisor may include single root input output virtualization (SR-IOV). "Single root input output virtualization" for the purposes of this disclosure is a software capability in which single Peripheral component interconnect express (PCIe) devices may be virtualized into multiple virtual devices. For example, and without limitation, a network adapter may be virtualized wherein multiple virtual adapters may exist. In one or more embodiments, SR-IOV may include the virtualization of physical components such as but not limited to, a GPU 108, network adapter, storage controllers, FPGA devices, audio processing cards, solid state drives and the like. In one or more embodiments, SR-IOV may allow for virtual machines to access a single physical device. In one or more embodiments, multiple virtual machines may have direct access to a physical device without an operating system 124 allocating resources. In one or more embodiments, SR-IOV may allow for the sharing of resources, such as for example network adapters, while still maintaining independence. In one or more embodiments, SR-IOV may allow for multiple virtual machines operating on a type 1 hypervisor to have access to physical devices without an intermediary such as a shot operating system 124. In one or more embodiments, computing devices 116 may contain physical hardware that is capable of virtualization. In one or more embodiments, hypervisor may contain the proper systems and/or software to enable SR-IOV wherein each virtual machine may receive a virtual component. In one or more embodiments, SR-IOV may allow for one or more separate virtual environments 152 with direct access to one or more physical hardware components of computing device 116. In one or more embodiments, hypervisor may include one or more virtual binary unit system 100 (BUS) adapters. A binary unit system 100 adapter (BUS) for the purposes of this disclosure is a hardware component, such as a cable, that allow communication between one or more physical devices on computing device 116. In one or more embodiments, BUS adapters may include various physical hardware such as but not limited to, USB adapters, graphics card adapters, sound card adapter, network adapter and the like. "Virtual Bus adapter" for the purposes of this disclosure is a software that is configured to mimic a physical BUS adapter and provide a connection between one or more virtual machines and/or containers 164. For example, and without limitation, Virtual BUS may allow for communication between one or more virtual machines and a network card. In one or more embodiments, BUS adapters may be virtualized to allow for connection of one or more virtual machines to one or more physical devices. In one or more embodiments, virtual BUS may emulate various physical devices wherein one or more virtual machines may connect to the virtual BUS. In one or more embodiments, Virtual BUS may include virtualized versions of physical hardware wherein one or more virtual machines may communicate with the one or more virtualized versions and wherein the virtualized versions may then communicate with the physical hardware. In one or more embodiments virtual BUS adapters may allow for increased isolation between one or more virtual environments 152, wherein each virtual environment 152 is connected to a separate virtual BUS adapter.

With continued reference to FIG. 1, computing device 116 is configured to create a separate virtual environment 152 for each of the one or more software containers 164 by allocating a dedicated private static memory 120 space. "Dedicated private memory 120 space" for the purposes of this disclosure refers to a partition of a storage device that is reserved exclusively for software container 164. For example, and without limitation, a storage device may include several partitions wherein at least partition may be reserved exclusively for the use of software container 164. "Dedicated private static memory 120 space" for the purposes of this disclosure refers to a partition having a fixed size value. In a static memory allocation 136, memory 120 and/or storage is allocated prior to partitioning and cannot be changed. In contrast to static memory allocation 136, dynamic memory allocation 136 allows the allocation and deallocation of memory 120 as needed by a particular software and/or operating system 124. In one or more embodiments, dynamic memory allocation 136 may lead to memory 120 leaks, memory 120 corruption, buffer overflows and the like. In one or more embodiments, dynamic memory allocation 136 causes other software on a system 100 to depend on one another. In one or more embodiments, static memory allocation 136 may allow for increased security and reliability. In one or more embodiments, each virtual environment 152 may be allocated dedicated private static memory 120 space wherein each dedicated private static memory 120 space includes a partition of memory 120. In one or more embodiments, each dedicated private static memory 120 space may include a child partition that has been created by the root partition. In one or more embodiments, each dedicated private static memory 120 space may contain its own separate virtual environment 152. In one or more embodiments, creating a separate virtual environment 152 for each of the one or more software may include creating a child partition for each virtual environment 152. In one or more embodiments, dedicated private static memory 120 space may include a guest operating system 124 of virtual environment 152. In one or more embodiments, data located on or within memory 120 may contain unique addresses in order to locate the data on memory 120. In one or more embodiments, memory 120 may contain unique addresses for every portion of a primary or secondary memory 120. In one or more embodiments, addresses are assigned to various portions of memory 120 to allow for a computing device 116 to read and write within a particular location. In one or more embodiments, memory 120 may be partitioned into multiple partitions wherein each partition may contain a separate portion of memory 120. In one or more embodiments, each partition may contain its own set of addresses configured to locate each partition. In one or more embodiments, each partition may contain its own range of addresses wherein a starting address may indicate the beginning of the partition and an ending address may indicate the end of the partition. In one or more embodiments, a computing device 116 accessing a partition may be given the beginning address and the end address of the partition. In one or more embodiments. In one or more embodiments, a partition such as dedicated private static memory 120 space may contain an upper limit wherein the upper limit contains the maximum capacity that may be allocated to the partition. In one or more embodiments, a partition may not exceed an upper limit such that the partition is allocated more storage and/or memory 120 that may be contained on memory 120. In one or more embodiments, each partition may contain a lower limit wherein each partition must be of a minimum value in order to allow for the storage of metadata and other critical information. In one or more embodiments, allocating dedicated memory 120 space may include comparing the allocated memory 120 space to an upper limit and lower limit.

With continued reference to FIG. 1, computing device 116 may be configured to create a separate virtual environment 152 for each of the one or more software containers 164 by allocating a dedicated private static memory 120 space as a function of the software data, wherein the separate virtual environment 152 comprises a dedicated operating system 124. In one or more embodiments, software data may contain a required memory 120 space wherein allocating the dedicated private static memory 120 space for each of the one or more software containers 164 as a function of the software data includes allocating the dedicated private static memory 120 space as a function of the required memory 120 space. In one or more embodiments, computing device 116 may allocate dedicated private static memory 120 space based on a required memory 120 space within software data. For example, and without limitation, required memory 120 space may include 2 gigabytes wherein computing device 116 may partition memory 120 to create dedicated private memory 120 space containing two gigabytes. In one or more embodiments, computing device 116 may receive software data upon selection of software container 164 wherein computing device 116 may create dedicated private static memory 120 space as a function of software data.

With continued reference to FIG. 1, computing device 116 may be configured to allocate a dedicated primary memory 120 space for each virtual environment 152. "Dedicated primary memory 120 space" for the purposes of this disclosure is a portion of a primary memory 120 that is partitioned and reserved for a particular function. For example, and without limitation, computing device 116 may contain 16 gigabytes of random-access memory 120 (RAM) wherein 2 gigabytes of RAM may be reserved and/or dedicated for a particular virtual environment 152 and/or virtual machine. In one or more embodiments, primary memory 120 may be partitioned wherein dedicated primary memory 120 space may include one or more partitions. In one or more embodiments, assigning dedicated primary memory 120 space may occur at a software level, wherein a software operating on a host operating system 124 may allocate RAM to each virtual environment 152. In one or more embodiments, allocating and/or assigning dedicated primary memory 120 space may occur on the hardware level wherein hardware virtualization may allow for partitioning of RAM at a hardware level. In one or more embodiments, partitioning on a hardware level may allow for increased safety wherein the RAM partition is not dependent on the vulnerabilities of the operating system 124. In one or more embodiments, partitioning on a hardware level may allow for increased independence of the virtual environment 152 from the host operating system 124. In one or more embodiments, partitioning RAM at a hardware level may allow for increased independence and isolation from other virtual environments 152. In one or more embodiments, software data may contain resource requirements wherein the resource requirements may contain a particular amount of RAM required for proper execution of software container 164. In one or more embodiments, computing device 116 may be configured to allocate a dedicated primary memory 120 space based on software data. In one or more embodiments, computing device 116 may allocate primary memory 120 space using hypervisor wherein RAM may be allocated prior to initialization of the virtual machine and/or virtual environment 152. In one or more embodiments, allocating primary memory 120 space may depend on a DAL level associated with software container 164. In one or more embodiments, a software module 128 within software container 164 having a higher DAL level may receive more RAM whereas a software module 128 associated with a lower DAL level may receive less RAM and/or dedicated primary memory 120 space.

In one or more embodiments, creating virtual environment 152 may further include assigning at least one dedicated processor core to each separate virtual environment 152. In one or more embodiment, processor may include a multi-core processor wherein each virtual environment 152 may be assigned a dedicated processor core. "Dedicated processor core" for the purposes of this disclosure is a portion of a multi-core processing component that is reserved exclusively for a particular function. For example, and without limitation, software container 164 may contain a dedicated processor core, wherein a single processor core of the multi-core processor may be used exclusively for execution of software container 164. In one or more embodiments, assigning dedicated processor core may allow for independence between two or more virtual environments 152. In one or more embodiments, assigning dedicated processor may allow for minimized communication between two virtual environments 152. In one or more embodiments, assigning dedicated processor core may allow for increased safety wherein failure of a particular processor core and/or virtual environment 152 may be independent of other processor cores and/or virtual environments 152. In one or more embodiment, each software container 164 and/or virtual environment 152 may be assigned at least one dedicated processor core. For example, and without limitation, in instances in which 6 virtual environments 152 are created, an 8-core processor may assign one processor core to each virtual environment 152. In one or more embodiments, virtual environments 152 may be assigned additional dedicated processor cores based on software data. In one or more embodiments, software data may contain resource requirements indicating the processing power required for software container 164 wherein a particular software container 164 may require more than one processor core. In one or more embodiments, assignments of dedicated processor cores may be based on DAL level wherein a software container 164 associated with a higher DAL level may be assigned more than one dedicated processor cores. In one or more embodiments, a process of assigning processor cores may be referred to as "CPU pinning." In one or more embodiments, CPU pinning may allow for proper resource allocation wherein a particular software container 164 cannot utilize more resources than it its given. In one or more embodiments, CPU pinning may prevent failures due to multiple software running on similar processor cores. In one or more embodiments, CPU pinning may allow for reliable and consistent processing power wherein each virtual environment 152 is given a fixed and independent amount of processing power. In one or more embodiments, computing device 116 may be configured to assigned one or more dedicated processor cores using hypervisor. In one or more embodiments, hypervisor may allow for 'pinning' of processor cores to each virtual environment 152, wherein each virtual environment 152 is assigned a dedicated processor core. In one or more embodiments, prior to initialization of virtual environment 152, hypervisor and/or computing device 116 may 'pin' and/or assign a dedicated processor core to each virtual machine and/or virtual environment 152.

With continued reference to FIG. 1, computing device 116 may allocate resources of multicore processor for each virtual environment 152. In one or more embodiments, computing device 116 may allocate processing units to each virtual environment 152. For example, and without limitations, computing device 116 may assign registers of processor to each virtual environment 152. Ion one or more embodiments, registers may be used to store data during execution of one or more functions and/or instructions. In one or more embodiments, allocation of registers may allow for storage space for memory 120 to be stored prior to execution and following execution of tasks. In one or more embodiments, each processor core may contain its own dedicated registers and caches wherein that are separate and isolated from cache and registers of other processor cores 100. In one or more embodiments, separation may allow for increased isolation between two processor cores. In one or more embodiments, allocating processor core may include allocating cache and registers of processor core. In one or more embodiments, cache may include a memory 120 of frequently used instructions wherein processor may be configured to access the instructions for faster processing. In one or more embodiment cache may include level 1 cache and level 2 cache which may be dedicated to each processor core. In one or more embodiments, cache may include a level 3 cache that may be shared by multiple processor cores 100. In one or more embodiments, a level 3 cache may contain memory 120 and/or instructions that can be shared amongst multiple cores. In one or more embodiments, level 3 cache may be isolated from each processor core wherein each processor core may be completely isolated from one another. In one or more embodiments level 3 cache may be assigned to a single processor core and/or may be partitioned for each processor core In order to prevent leakage of information from one processor core to another. In one or more embodiments, hypervisor may be configured to partition caches in order to increase isolation amongst virtual environments 152. In one or more embodiments, cache may leak through cache side channel attacks. In one or more embodiments, memory 120 may be encrypted prior to transmission to processor wherein leaked information between, to, and/or from a cache may be encrypted. In one or more embodiments, portions of L3 cache may be partitioned to prevent data leakage. In one or more embodiments, allocating a dedicated processor core to each virtual environment 152 may allow for decreased chances for cache side channel attacks.

With continued reference to FIG. 1, computing device 116 may be configured to instantiate hypervisor wherein hypervisor is configured to allocate dedicated private memory 120 space, allocate dedicated primary memory 120 space, assign more one or more processors core and the like to virtual machine. In one or more embodiments, virtual environment 152 may be created on virtual machine wherein a guest operating system 124 may exist separate and independent from host operating system 124. In one or more embodiments, a virtual template may be used to configure virtual machine and create virtual environment 152 for software container 164. "Virtual template" for the purposes of this disclosure is a list of instructions or code that are configured to automate the creation of a particular virtual environment 152. For example, and without limitation virtual template may contain code configuring computing device 116 to create a virtual machine having dedicated private memory 120 space, dedicated primary memory 120 space and/or one or more dedicated processor cores, wherein a virtual environment 152 may be created on the virtual machine. In one or more embodiments, virtual template may include a single executable file that is configured to allocate physical hardware resources for a virtual machine and initialize a virtual environment 152. In one or more embodiments, virtual template may include predefined resource requirements, such as but not limited, predefined amount of dedicated private static memory 120 space, predefined amount of processor cores, predefined amount of dedicate primary memory 120 space, predefined guest operating system 124 and the like. In one or more embodiments, hypervisor in host operating system 124 may contain command line tools that allow for automating a process in which a virtual environment 152 is created. In one or more embodiments, virtual template may contain instructions in a particular order, wherein a hypervisor may first be instantiated or installed (with predefined settings), the virtual machine is created, resources are allocated for the virtual machine, guest operating system 124 is installed on virtual machine to create virtual environment 152 and/or software container 164 is deployed within virtual environment 152. In one or more embodiments, computing device 116 may utilize a script status list to determine if each line of code or instructions were properly executed. "Script status list" for the purposes of this disclosure is information indicating if a proper line of code or instructions within virtual template was properly executed. In one or more embodiments, script status list may return a '0' in instances where the code was properly executed. In one or more embodiments, computing device 116 may be configured to cease execution of following instructions and/or code in instances in which a set of code or instructions had not been properly executed. In one or more embodiments, ceasing execution of virtual script may indicate that a virtual environment 152 may not be stable, and as a result, software module 128 may not be properly executed within virtual environment 152. In one or more embodiments, virtual template may be created using hypervisor. In one or more embodiments, virtual template may allow for preconfigured parameters for a virtual environment 152. In one or more embodiments, virtual template may allow for creation of a virtual environment 152 that is exclusive for software container 164. In one or more embodiments, creation of virtual template may allow for removal of unwanted software components that will not be utilized by software module 128. In one or more embodiments, creation of virtual template may allow for creation of a lightweight operating system 124 that contains only the software components that will facilitate the execution of software module 128 and/or software container 164. In one or more embodiments, creation of a lightweight operating system 124 may allow for increased resource allocation wherein guest operating system 124 may utilize less resources such as memory 120, processing power and the like.

With continued reference to FIG. 1, computing device 116 may be configured to execute software module 128 within virtual environment 152. In one or more embodiments, execution of software module 128 may include the use of container 164 runtime wherein container 164 runtime may manage dependencies such as dedicated software packages. In one or more embodiments, container 164 runtime may be configured to ensure that dependencies of software module 128 are taken exclusively from within software container 164 and not form the surrounding operating system 124 and/or virtual environment 152. In one or more embodiments, software module 128 may be executed upon selection of software container 164 within virtual environment 152 by user. In one or more embodiments, selection may include any interaction using one or more input devices as described in this disclosure, such as but not limited to, the clicking of a mouse, the clicking of a keyboard button, and the like. In one or more embodiments, virtual template may include instructions to deploy software module 128 upon creation of virtual environment 152.

With continued reference to FIG. 1, in one more embodiments, computing device 116 may initially receive software module 128 and generate software container 164 as a function of software module 128. In one or more embodiments, computing device 116 may be configured to receive at least a software module 128 and generate virtual environment 152 for software module 128. In one or more embodiments, computing device 116 and/or multi-core processor may create a separate virtual environment 152 for the at least a software module 128, wherein creating the virtual environment 152 further includes generating virtualization layer 156 and allocating dedicated private static memory 120 space through the virtualization layer 156, wherein the separate virtual environment 152 includes a dedicated operating system 124. In one or more embodiments, computing device 116 may be configured to integrate the at least a software module 128 into the virtual environment 152 by instantiating, the software module 128 into at least one software container 164, wherein the at least one software container 164 includes a plurality of dedicated software packages. In one or more embodiments, computing device 116 may then be configured to execute the software module 128 on each software container 164 for each virtual environment 152. In one or more embodiments, processor may be configured to integrate software module 128 into virtual environment 152 using a pre-defined operational rule by instantiating software module 128 into software container 164, wherein the at least software container 164 may contain a non-preemptible container 164 runtime. In some cases, software module 128 may interact with other components via one or more interfaces (e.g., APIs). In an embodiment, software module 128 may be designed to be reusable and to provide certain functionality that may be integrated into one or more different operating systems 124 or larger software applications. In a non-limiting example, at least one operational rule may include a series of rules or polices that dictate how software module 128 interacts with the system and/or the users, this may include, without limitation, utilize computational resources, how it is executed, and/or the like. In a non-limiting example, in a software critical operating environment (SCOE), such as avionics system as described herein, at least one operational rule may ensure that software module 128 does not interfere with any operation of other system components e.g., partitions within virtual environment 152, that software module 128 may uses dedicated system resources e.g., dedicated private static memory 120 space, or one or more other functionalities or services provided by other partitions within virtual environments 152 in a way that does not degrade system performance, and that software module 128 may run.

With continued reference to FIG. 1, software container 164 may include code, runtime, system tools, system libraries, configurations, and/or the like. In some cases, software container 164 may provide a "second layer" of isolation or protection from virtual environment 152 and other containers 164 and/or partitions. In one or more embodiments, software container 164 may include a standard unit of software that packages up code and all its dependencies such that integrated software module 128 may run under a desired performance from one operating environment and/or operating system 124 to another. In some cases, software container 164 may be created based on a software image as described above. In a non-limiting example, a first partition may include a container 164 manager wherein the "container 164 manager," for the purpose of this disclosure, is a component used to manage and/or orchestrate a plurality of containers 164. In some cases, each virtual environment 152 include a container 164ized application environment. In some cases, container 164 manager may be configured to create and further deploy one or more containers 164 within virtual environment 152. In some cases, plurality of software containers 164 may be run simultaneously. In an embodiment, container 164 manager may include an engine that provide at least an operating system 124 e.g., CentOS, Debian, Fedora, RHEL, Ubuntu, Windows, MacOS, and/or the like, wherein the engine may enable one or more software containers 164 to run in any partition or virtual environment 152 consistently. In some cases, container 164 manager may also be configured to validate the authenticity of software images, load container 164 executables into container 164 environments, connect container 164 environments to operating service, and exports management APIs to other system management tools. In some cases, each partition may include a container 164 manager, and plurality of container 164 managers of plurality of partitions may be (indirectly) communicative each other. In some cases, container 164 manager at second may be known as "container 164 agent." In a non-limiting example, software image may become a container 164 at runtime-when it is running on the container 164 agent.

With continued reference to FIG. 1, a "non-preemptible container 164 runtime," as described herein, is a runtime that once at least one software container 164 is up and running, it cannot be interrupted or preempted by another processor. In cases where at least one software container 164 is running at RTOS, certain level of service or response time may be guaranteed. In a non-limiting example, at least one software container 164 may be granted access to processor, memory 120, and other resources as described above according to partition policy based its priority, and once software module 128 is running, it may have exclusive access to dedicated resources until it completes execution. In a non-limiting example, at least one operational rule of software module 128 and/or software container 164 may be specific one or more safety-critical tasks which must not be delayed or interrupted by other non-critical tasks running on other partitions. Exemplary embodiments of software container 164 may include a DOCKER container 164 (that encapsulate any payload and dependencies into a single object", RTOS container 164, safety-certified container 164 (designed to meet stringent certification requirements of regulatory bodies such as, without limitation, FAA or EASA), among others. In a non-limiting example, software container 164 may capture a flight management software (FMS) module, wherein the FMS module may be configured to perform critical functions related to navigation and flight planning defined by its operational rule. Such FMS module may be instantiated within a software container 164 and run with a non-preemptible runtime to ensure that navigation calculations and related data processing are not interrupted to maintain safety of flight operations.

With continued reference to FIG. 1, in one or more embodiments, instantiating software module 128 into software container 164 may include extracting software metadata from software image, wherein the software metadata may include a plurality of software configuration parameters and a plurality of digital files. As used in this disclosure, "software metadata" is information related to software module 128. In a non-limiting example, software metadata may include a manifest file specifying software version number, required dependencies, configurations and/or the like. In one or more embodiments, software metadata may include or be included within software data. As described herein, "software configuration parameters" are parameters that dictate how software module 128 should be set up within a particular standard operating environment (SOE). Exemplary software configuration parameters may include, without limitation, one or more environment variables, service endpoints, port numbers, paths to necessary libraries or dependencies, and/or other configuration data necessary for software module 128 to run correctly within virtual environment 152. In some cases, processor may configure container 164 manager within host operating system 124 through virtualization layer 156 to initialize at least one software container 164 within virtual environment 152 as a function of plurality of software configuration parameters by preparing container 164 environment i.e., non-preemptible container 164 runtime based on one or more software configuration parameters. This may be done, for example, by setting up correct file paths, configuring virtual network settings, installing required libraries, and/or the like based on plurality of software configuration parameters. Integrating software module 128 may further include deploying plurality of digital files and/or dedicated software packages within the initialized software container 164. As used in this disclosure, "digital files" are a set of files each containing at least a portion of at least one operational rule. In some cases, plurality of digital files may include any files that necessary for the operation of integrated software module 128, for example, and without limitations, plurality of digital files may include one or more executable files, libraries, scripts, certificates for securities, data files, and/or the like. Container 164 manager may place plurality of digital files and/or dedicated software packages in correct directories, setting permission, prepare container 164 agent to execute plurality of digital files. In some cases, container 164 agent may load at least one operational rule into non-preemptible container 164 runtime. In a non-limiting example, at least one operational rule may govern how software module 128 operates within software container 164 and virtual environment 152 e.g., interaction with other software applications, utilization of dedicated resources, response to certain events, among others.

With continued reference to FIG. 1, virtual environment 152 may be created as a function of a configuration request. As used in this disclosure, a "configuration request" is a structured set of data or a command to provide a specific operational environment or resources. In some cases, configuration request may be sent by a software entity as described below or component such as, without limitation, host operating system 124 and/or a separate virtual environment 152, asking another entity such as, without limitation, hypervisor to establish, modify, or provide a desired SOE. In a non-limiting example, host operating system 124 may include a management VM configured to monitor, manage, and/or administer overall operations and resources within virtual environment 152. In a non-limiting example, host operating system 124 may include, or at least interface with one or more health monitors, system health management PSSS, aircraft system monitoring PCS, operational mode management PCS, and/or the like. In one or more embodiments, virtual environment 152 may be created as function of a partition policy as described above. In one or more embodiments, allocating a dedicated private static memory 120 space through the virtualization layer 156 may include allocating a dedicated private static memory 120 space as a function of a configuration request. In one or more embodiments, configuration request may contain various resource requirements, such as but not limited to memory 120, processing power and the like. In one or more embodiments configuration request may indicate a particular dedicated private static memory 120 space that may be required. In one or more embodiments, configuration request may be created as a function of software data wherein required sources within software data may be used to generate configuration request.

With continued reference to FIG. 1, in one or more embodiments, creation of virtual environment 152 may allow for predictable results wherein each iteration may contain the same resource requirements, the same code and the like. In one or more embodiments, virtual environment 152 may be modified following each iteration wherein software components that are not used by software container 164 may be removed to allow for increased resource allocation for software container 164. In one or more embodiments, following each iteration the amount of dedicated primary memory 120 space, dedicated processor cores and/or dedicated private static memory 120 space may change based on resources used in a previous iteration. In one or more embodiments, virtual template may allow for predictable results amongst one or more differing computing devices 116. In one or more embodiments, virtual template may allow for cloning of a virtual environment 152 containing software container 164, wherein a second virtual template, cloned by virtual template may be used by another individual for similar uses.

With continued reference to FIG. 1, virtual template may include and/or be included within a single executable file. In one or more embodiments, the single executable file may initialize hypervisor, create virtual machine, allocate resources to the virtual machine, install guest operating system 124 on the virtual machine to create virtual environment 152, deploy software container 164 in the virtual machine and within virtual environment 152, install container 164 runtime within virtual environment 152 and/or deploy software container 164 within virtual environment 152. In one or more embodiments, a virtual template may contain a single executable file wherein selection of the single executable file may create virtual machine and deploy software container 164 within virtual environment 152. In one or more embodiments, a plurality of virtual templates may exist wherein selection of each template may cause creation of a particular virtual environment 152 that is exclusively created for a particular software container 164. In one or more embodiments, each of a plurality of software containers 164 may be associated with a particular virtual template. In one or more embodiments, selection of the virtual template may be associated with initialization of a particular software container 164.

With continued reference to FIG. 1, virtual template may include and/or be included in an install script file. "Install script file" for the purposes of this disclosure is an automated script in which one or more processes may occur after installation of a software. For example, and without limitation, install script file may be configured to deploy software container 164 after execution of virtual machine and virtual environment 152. In one or more embodiments, install script file may be generated using an installer on a host operating system 124. In one or more embodiments, installing script file may allow for execution and initiation of multiple software in a single script. For example, and without limitation, installing script file may allow for initialization of hypervisor, creation of virtual machine, and deployment of software container 164 within virtual machine. In one or more embodiments, virtual template may contain a single executable file containing software container 164, virtual environment 152, container 164 runtime, and/or any other data as described in this disclosure that may be used for generation of virtual environment 152 and deployment of software container 164. In one or more embodiments, single executable file may allow for an automated process in which a virtual machine may be created for software module 128. In one or more embodiments, single executable file may allow for decreased risk of human error in the generation of virtual machines and virtual environments 152. In one or more embodiments, virtual template may allow for repeatability and dependency of software module 128 within virtual environment 152.

With continued reference to FIG. 1, in one or more embodiments, hypervisor may include type 1 hypervisor wherein the type 1 hypervisor creates virtualization layer 156 above one or more physical hardware components of computing device 116. In one or more embodiments, virtual template may be configured to interact with hypervisor's management tools and/or application program interface. In one or more embodiments, virtual template may interact with hypervisor wherein virtual machine may be created on type 1 hypervisor. In one or more embodiments, virtual template may automate the virtual machine making process wherein virtual template may create virtual machine and generate virtual environment 152 containing software container 164 and/or software module 128.

With continued reference to FIG. 1, in one or more embodiments, virtual machine may contain virtual environment 152 wherein software container 164 and/or software module 128 is executed within virtual environment 152. In one or more embodiments, following execution and creation of virtual machine, virtual environment 152 and/or software container 164, virtual machine may be packaged for future use. In one or more embodiments, virtual machine may be packaged to include virtual environment 152 and/or any information contained within virtual environments 152, such as but not limited to, software container 164 and data produced by software container 164. In one or more embodiments, hypervisor may allow for generation of a virtual package. "Virtual package" for the purposes of this disclosure is a virtual machine, containing a generated environment including information within the virtual environment 152. For example, and without limitation "Virtual package" may include virtual machine, having information indicating dedicated private static memory 120 space, dedicated processor cores, dedicated primary memory 120 space and the like. In one or more embodiments, virtual package may include virtual machine that has been created for initialization and/or deployment of software container 164. In one or more embodiments, virtual package may contain open virtualization format (OVF), virtual hard disk (VHD) and/or any other format that may allow for portability of virtual machine wherein virtual package may be instantiated on more than one computing devices 116. In one or more embodiments, virtual package may include an already installed operating system 124 containing software module 128. In one or more embodiments, upon termination of use of software module 128, virtual machine may be saved in an OVF format wherein virtual machine may be instantiated on differing devices. In one or more embodiments, hypervisor may contain one or more features configured to allow for export of virtual machine and/or a cloning of virtual machine wherein virtual machine and all of its components may be packaged into a single file. In one or more embodiments, virtual package may be deployed one or more computing devices 116. In one or more embodiments, virtual package contain an OVF format wherein virtual package may be deployed on a type 1 hypervisor and/or type 2 hypervisor. In one or more embodiments, virtual package may include virtual machine metadata wherein virtual machine metadata may include information such as but not limited to, virtual hardware (e.g. dedicated private static memory 120 space, dedicate processor, etc.), various virtual machine settings and the like. In one or more embodiments, virtual package may be generated as a function of virtual template wherein virtual template may create virtual machine, generate virtual environment 152 and deploy software container 164 and wherein the virtual machine may be packaged as a virtual package. In one or more embodiments, virtual package may allow for portability of software module 128 wherein any computing device 116 containing hypervisor may be used to execute virtual package. In one or more embodiments, virtual package may be cloned for use on one or more computing devise. In one or more embodiments, virtual package may serve as an operating system 124 configured solely for software container 164. In one or more embodiments, virtual package may be deployed on type 1 hypervisor and/or type 2 hypervisor depending on the importance and safety of software module 128.

With continued reference to FIG. 1, in one or more embodiments, virtual package may be generated on host operating system 124. In one or more embodiments, type 2 hypervisor may exist on host operating system 124 wherein virtual template may be configured to generate virtual package using type 2 hypervisor. In one or more embodiments, virtual package may then be saved in an OVF format and used in in the future with type 1 hypervisor. In one or more embodiments, virtual package may include various network settings, various security setting, various data saved on virtual machine and the like. In one or more embodiments, virtual package may be continuously modified and/or updated. In one or more embodiments, virtual package may allow for interaction of software module 128, wherein data generated from software module 128 and/or modifications made to software module 128 may be saved for future iterations. In one or more embodiments, virtual package may be imported into more than one hypervisors. In one or more embodiments, virtual package may allow for portability of software module 128, wherein software module 128 and/or any generated data may be executed on any machine containing hypervisor. In one or more embodiments, computing device 116 may contain a plurality of virtual packages, wherein each virtual package may contain a separate virtual machine virtual environment 152 and/or software container 164. In one or more embodiments, selection of one or more virtual packages may allow for execution of one or more virtual environments 152. In one or more embodiments, virtual package may allow for repeatability and reliability of software module 128. In one or more embodiments, virtual package may be placed on a portable hard storage device, transmitted to a database and the like for future access.

With continued reference to FIG. 1, In one or more embodiments, software container 164, virtual template and/or virtual package may include a reusable software component (RSC). "Reusable software component" for the purposes of this disclosure is a software that has been pre-tested and has been certified to be used multiple times and on multiple systems. For example, and without limitation, software container 164 may include RSC wherein software container 164 may be reused on differing operating systems 124 and has been tested multiple times. In one or more embodiments, an RSC may allow for efficiency and consistency wherein software that has been proven to work may be duplicated and/or used on multiple differing systems and/or operating systems 124. In one or more embodiments, a piece of software may be created as an independent component and then labeled as an RSC following testing of the software. In one or more embodiments, RSC may include a software that has been tested by various aviation and/or military authorities and has been validated and/or certified for reuse. In one or more embodiments, a unit of software can be developed initially as an independent component. Software units developed as independent software components specifically for reuse and then airworthiness qualified as part of a system 100 can be endorsed by the cognizant airworthiness authority as reusable for subsequent systems. The scenarios for reuse may dictate the amount of credit that will be allowed by the airworthiness authority. Any of the software life cycle artifacts (such as requirements specifications, design documents, test reports, source code, or any other life cycle artifacts supporting software qualification), can be developed for reuse, if those artifacts are initially developed specifically for the software unit separate from the artifacts for the initial system 100 the software unit and/or software module 128 is first qualified with. Purchase of software "off the shelf" does not necessarily mean that software carries any airworthiness pedigree, nor does it infer that the proper documentation for reuse exists. Some do, and these do offer documentation, so this characterization of software overlaps that of the RSC. In one or more embodiments, software container 164, virtual template and/or virtual package may be certified for reuse, wherein software container 164, virtual template and/or virtual package may be relied upon to perform the same functions with the same reliability and consistency in every iteration.

With continued reference to FIG. 1, in one or more embodiments, virtual machine and/or virtual environment 152 may exist wherein virtual environment 152 may contain an operating system 124 ready to deploy software container 164. In one or more embodiments, an already existing virtual machine and/or virtual machine may be contained within virtual package wherein virtual package contains virtual environment 152 having solely an operating system 124. In one or more embodiments, software container 164 may be deployed to virtual environment 152 wherein virtual package may be instantiated and software container 164 may be deployed to virtual environment 152. In one or more embodiments, virtual packages containing virtual machines and virtual environments 152 for each software container 164 may cause increased storage usage and decreased portability. In one or more embodiments, one or more virtual packages may be created, wherein each virtual package contains virtual machine with predefined resources allocated and an already generated virtual environment 152. In one or more embodiments, one or more virtual package may be instantiated wherein one or more software containers 164 may be deployed within virtual environment 152. In one or more embodiments, software container 164 may be deployed on virtual environment 152. In one or more embodiments, following termination of software module 128 within virtual environment 152, software container 164 may be removed. In one or more embodiments, software container 164 may allow for containment of software module 128 wherein software container 164 does not rely on the operating system 124 within virtual environment 152. In one or more embodiments, upon termination of software module 128, data generated within software module 128 may be contained within software container 164. In one or more embodiments, virtual package may include a bare operating system 124 in which software container 164 may not affect various systems and settings on the operating system 124. In one or more embodiments, a user may select from a plurality of preconfigured virtual packages wherein, each preconfigured virtual package may contain a pre-installed operating system 124, pre-installed container 164 runtime, reconfigured resources allocated and the like. In one or more embodiments, plurality of virtual packages may allow for differing virtual environments 152 that suited to differing software containers 164. For example, and without limitation, a first virtual package may contain 2 gigabytes of allocated resources, whereas a second virtual environment 152 may contain 4 gigabytes of allocated resources. In one or more embodiments, system 100 may include a virtual machine container 164. "Virtual machine container 164" for the purposes of this disclosure is a preconfigured machine having a preconfigured operating system 124 installed. In one or more embodiments, virtual machine container 164 may be compared to a newly installed operating system 124 wherein the operating system 124 on a computing device 116. In one or more embodiments, virtual machine container 164 may be configured to deploy software containers 164 in a separate environment from the host operating system 124. In one or more embodiments, software containers 164 deployed within virtual machine container 164 may not affect systems, settings and the like within virtual machine container 164, wherein virtual machine container 164 may be used for a plurality of software containers 164. In one or more embodiments, virtual machine container 164 may be cloned to allow for multiple software containers 164 to be deployed within multiple virtual machine containers 164. In one or more embodiments, virtual machine containers 164 may contain operating systems 124 in which software, data and/or settings remain consistent and unchanged allowing for increased repeatability. In one or more embodiments, virtual machine container 164 may contain an OVF format and be used similarly to virtual package.

With continued reference to FIG. 1, in one or more embodiments, virtual package and/or virtual container 164 may be instantiated directly on hypervisor. In one or more embodiments, host operating system 124 may exist on computing device 116, wherein virtual package and/or virtual container 164 may be instantiated through host operating system 124. In one or more embodiments, virtual package and/or virtual container 164 running atop type 1 hypervisor may be accessed through remote software such as but not limited to remote desktop software, a console such as a hypervisor console, a secure shell (SSH), A virtual network software (VNC) and the like. In one or more embodiments, one or more virtual machines may be accessed from host operating system 124 while still allowing for the virtual machines to run atop type 1 hypervisor. In one or more embodiments, remote software may allow for initialization of a virtual environment 152 through host operating system 124. In one or more embodiments, remote software may allow for independence between host operating system 124 and virtual environment 152 while still allowing for access to virtual environment 152. In one or more embodiments, remote software may allow for access to multiple virtual environments 152 wherein multiple virtual environments 152 may be displayed on a single display device.

With continued reference to FIG. 1, virtual environment 152 may be connected to one or more physical devices of the computing device 116 through a virtual binary unit apparatus (BUS) adapter. Virtual environments 152, containers 164, and the like may be implemented, without limitation, as disclosed in U.S. Nonprovisional application Ser. No. 18/395,210, filed on Dec. 22, 2023, and entitled "SYSTEM AND METHOD FOR A SAFETY CRITICAL OPERATING ENVIRONMENT CONTAINER ARCHITECTURE," the entirety of which is incorporated by reference herein. For instance, and without limitation, a hypervisor and/or operating system 124 may include single root input output virtualization (SR-IOV). "Single root input output virtualization" for the purposes of this disclosure is a software capability in which single Peripheral component interconnect express (PCIe) devices may be virtualized into multiple virtual devices. For example, and without limitation, a network adapter may be virtualized wherein multiple virtual adapters may exist. In one or more embodiments, SR-IOV may include the virtualization of physical components such as but not limited to, a GPU 108, network adapter, storage controllers, FPGA devices, audio processing cards, solid state drives and the like. In one or more embodiments, SR-IOV may allow for virtual machines to access a single physical device. In one or more embodiments, multiple virtual machines may have direct access to a physical device without an operating system 124 allocating resources. In one or more embodiments, SR-IOV may allow for the sharing of resources, such as for example network adapters, while still maintaining independence. In one or more embodiments, SR-IOV may allow for multiple virtual machines operating on a type 1 hypervisor to have access to physical devices without an intermediary such as a shot operating system 124. In one or more embodiments, computing devices 116 may contain physical hardware that is capable of virtualization. In one or more embodiments, hypervisor may contain the proper systems and/or software to enable SR-IOV wherein each virtual machine may receive a virtual component. In one or more embodiments, SR-IOV may allow for one or more separate virtual environments 152 with direct access to one or more physical hardware components of computing device 116. In one or more embodiments, hypervisor may include one or more virtual binary unit apparatus 100 (BUS) adapters. A binary unit apparatus 100 adapter (BUS) for the purposes of this disclosure is a hardware component, such as a cable, that allow communication between one or more physical devices on computing device 116. In one or more embodiments, BUS adapters may include various physical hardware such as but not limited to, USB adapters, graphics card adapters, sound card adapter, network adapter and the like. "Virtual Bus adapter" for the purposes of this disclosure is a software that is configured to mimic a physical BUS adapter and provide a connection between one or more virtual machines and/or containers 164. For example, and without limitation, Virtual BUS may allow for communication between one or more virtual machines and a network card. In one or more embodiments, BUS adapters may be virtualized to allow for connection of one or more virtual machines to one or more physical devices. In one or more embodiments, virtual BUS may emulate various physical devices wherein one or more virtual machines may connect to the virtual BUS. In one or more embodiments, Virtual BUS may include virtualized versions of physical hardware wherein one or more virtual machines may communicate with the one or more virtualized versions and wherein the virtualized versions may then communicate with the physical hardware. In one or more embodiments virtual BUS adapters may allow for increased isolation between one or more virtual environments 152, wherein each virtual environment 152 is connected to a separate virtual BUS adapter.

Still referring to FIG. 1, operating system 124 and/or at least a processor core may be configured to integrate software module 128 into virtual environment 152 by instantiating the software module 128 into at least one software container 164, wherein the at least one software container 164 comprises a plurality of dedicated software packages.

With continued reference to FIG. 1, a processor may be configured to receive and/or generate one or more software containers 164. A "software container 164" for the purposes of this disclosure is an executable package that is capable of running software within an isolated space. For example, and without limitation, software container 164 may include a document drafting software wherein the software container 164 may contain any information, runtime environment and the like necessary to execute the document drafting software on more than one operating systems 124. In one or more embodiments, software containers 164 may create a virtualized environment wherein a software may run within the virtualized environment. "Virtualized Environment" for the purposes of this disclosure is a system in which software may be isolated while still operating on a host operating system 124. For example, and without limitation, software container 164 may operate in a virtualized environment wherein a software within software container 164 may not communicate with the host operating system 124. In one or more embodiments, software container 164 may allow for OS virtualization wherein a software may be isolated from a host operating system 124 while still sharing the host operating system 124 kernel. "Operating system 124 (OS) level virtualization" for the purposes of this discourse is a system in which an operating system 124 kernel allowed the existence of multiple isolated environment. In OS virtualization, a software within software container 164 may not have access to resources of the host operating system 124. Instead, the software may only have access to the contents within software container 164. In one or more embodiments, an ordinary software operating outside of a software container 164 may have access to various operating system 124 resources such as but not limited to, processing capabilities, file systems, networks and the like. In contrast, a software operating within a software container 164 may only have access to the contents within the software container 164. This may include various files, network capabilities and the like. In one or more embodiments, a software within software container 164 may communicate with software container 164 wherein software container 164 may transmit the commands to the processor. In one or more embodiments, software container 164 may contain application-level virtualization. "Application-level virtualization" for the purposes of this disclosure is a system in which a software may be completely encapsulated from a host operating system 124 such that the software may not share the host operating system 124 kernel. In one or more embodiments, in application-level virtualization an application may be encapsulated within a virtual environment 152 as described in further detail below. In one or more embodiments, in application-level virtualization an application may communicate through a virtualization layer 156 such as one created by a hypervisor as described in further detail below. In one or more embodiments, application virtualization may include a process in which the application does not rely on the host operating system 124 kernel. In one or more embodiments, software container 164 may contain OS level virtualization wherein a software within software container 164 may be executed in a virtualized environment. In one or more embodiments, software container 164 may contain application virtualization wherein a software may be executed on multiple differing operating system 124. In one or more embodiments, in an OS level virtualization, a software may be dependent on the host operating system 124 kernel wherein in an application virtualization, the software may run independent of the host operating system 124 kernel. In one or more embodiments, software container 164 may isolate an application from a surrounding environment wherein the software may operate in a runtime environment. In one or more embodiments, the runtime environment includes everything necessary to allow for isolation of a software from the host operating system 124. This may include but is not limited to, application and/or software code, dependencies, runtime components needed to execute the application such as access to a database, and the like. In one or more embodiments, a software within software container 164 may operate in a runtime environment wherein the software may be isolated for the host operating system 124. In one or more embodiments, software container 164 may allow for an application to be executed and/or deployed on multiple operating systems 124. In one or more embodiments, software container 164 may contain libraries, configuration files, binary code and/or any other information that is necessary to execute the application and/or software. In one or more embodiments, a software container 164 may contain some degree of independence from the operating system 124 and/or host apparatus 100 wherein the software container 164 does not rely on the operating system 124 for any information needed to properly deploy an application within software container 164. In one or more embodiments, operating systems 124 may lack the proper functionalities to execute an application, wherein software container 164 may be used to ensure that any necessary functionalities, information, and the like are self-contained. In one or more embodiments, software container 164 may contain a container 164 image, wherein the container 164 image is a portable executable image combined with a manifest that is used by a container 164 manager to deploy the container 164 image on an operating environment with appropriate data services and restrictions. In one or more embodiments, software container 164 may contain restrictions and/or instructions on how a software may communicate with the operating system 124 in which it is deployed on. In one or more embodiments, software container 164 may contain a container 164 manager, wherein the container 164 manager has the ability to deploy container 164 images on the operating system 124. The container 164 manager may interface with container 164 image repositories, validate the authenticity of container 164 images, load container 164 executables into container 164 environments, connect container 164 environments to operating service, and exports management application user interfaces (API) to apparatus 100 management tools.

Still referring to FIG. 1, at least a processor core and/or operating system 124 is configured to execute the software module 128 the software container 164. In a non-limiting example, software module 128 may include machine learning model. In some embodiments, a machine learning model may be configured to operate independently of a data source connection. For instance, and without limitation, apparatus 100 or any element of and/or executing on apparatus 100 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, dedicated software package may include one or more machine learning models, wherein the machine learning models may be configured to operate independent of a data source connection. In one or more embodiments, software container 164 and/or dedicated software package may include a machine learning module to implement one or more algorithms or generate one or more machine-learning models to generate outputs. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from libraries, dependencies and the like contained within software container 164 or be provided by a user. In other embodiments, a machine-learning module may obtain a training set by querying a communicatively connected database that includes past inputs and outputs. Training data may include inputs from various types of databases, resources, libraries, dependencies and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module may be used to create a machine learning model and/or any other machine learning model using training data. Training data may be data sets that have already been converted from raw data whether manually, by machine, or any other method. In some cases, the machine learning model may be trained based on user input. For example, a user may indicate that information that has been output is inaccurate wherein the machine learning model may be trained as a function of the user input. In some cases, the machine learning model may allow for improvements to computing device 116 such as but not limited to improvements relating to comparing data items, the ability to sort efficiently, an increase in accuracy of analytical methods and the like. In one or more embodiments, the machine learning models may operate independent of a data source connection wherein dependencies, training data, libraries and the like may be contained within software container 164.

With continued reference to FIG. 1, in one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from a database, dependencies within software container 164 and/or be provided by a user. In other embodiments, machine-learning module may obtain a training set by querying a communicatively connected database that includes past inputs and outputs. Training data may include inputs from various types of databases, resources, libraries, dependencies and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories.

With continued reference to FIG. 1, each software container 164 may contain a self-contained machine learning model wherein training data may be contained within the software container 164 as well. In one or more embodiments, software container 164 may be connected to a database upon execution of software module 128 wherein training data may be retrieved from the database. In one or more embodiments, each software container 164 may contain training data specific to each software module 128. For example, and without limitation, a first software container 164 may contain a first machine learning model and a first training data set, and a second software container 164 may contain a second machine learning model and a second training data set. In one or more embodiments, container 164ization of a machine learning model as well as training data may allow for portability of software module 128. In one or more embodiments, software container 164 may contain an application program interface (API) that is configured to allow software module 128 and the machine learning model to interact with one another. In one or more embodiments, the machine learning model may contain its own libraries, dependencies and the like. in one or more embodiments, software container 164 may contain the requisite code to call and implemented the machine learning model into software module 128.

In a non-limiting embodiment, and still referring to FIG. 1, at least a processor core and/or operating system may be configured to modify resource allocation and update the virtual environment based on the modified resource allocation. For instance, and without limitation, apparatus 100 and/or operating system 124 may be configured to measure an amount of time or resources used to perform a given operation, produce an output, or the like; where such amount of time or resources exceeds a probable and/or maximal resource requirement, apparatus may recalculate one or more resource requirements or other allocation determinations, and allocate more resources based on the recalculated requirements, which may be performed in any manner described above; alternatively or additionally, a user may enter a revised resource requirement and/or an updated or modified software module may include an updated resource requirement.

Figure 2:
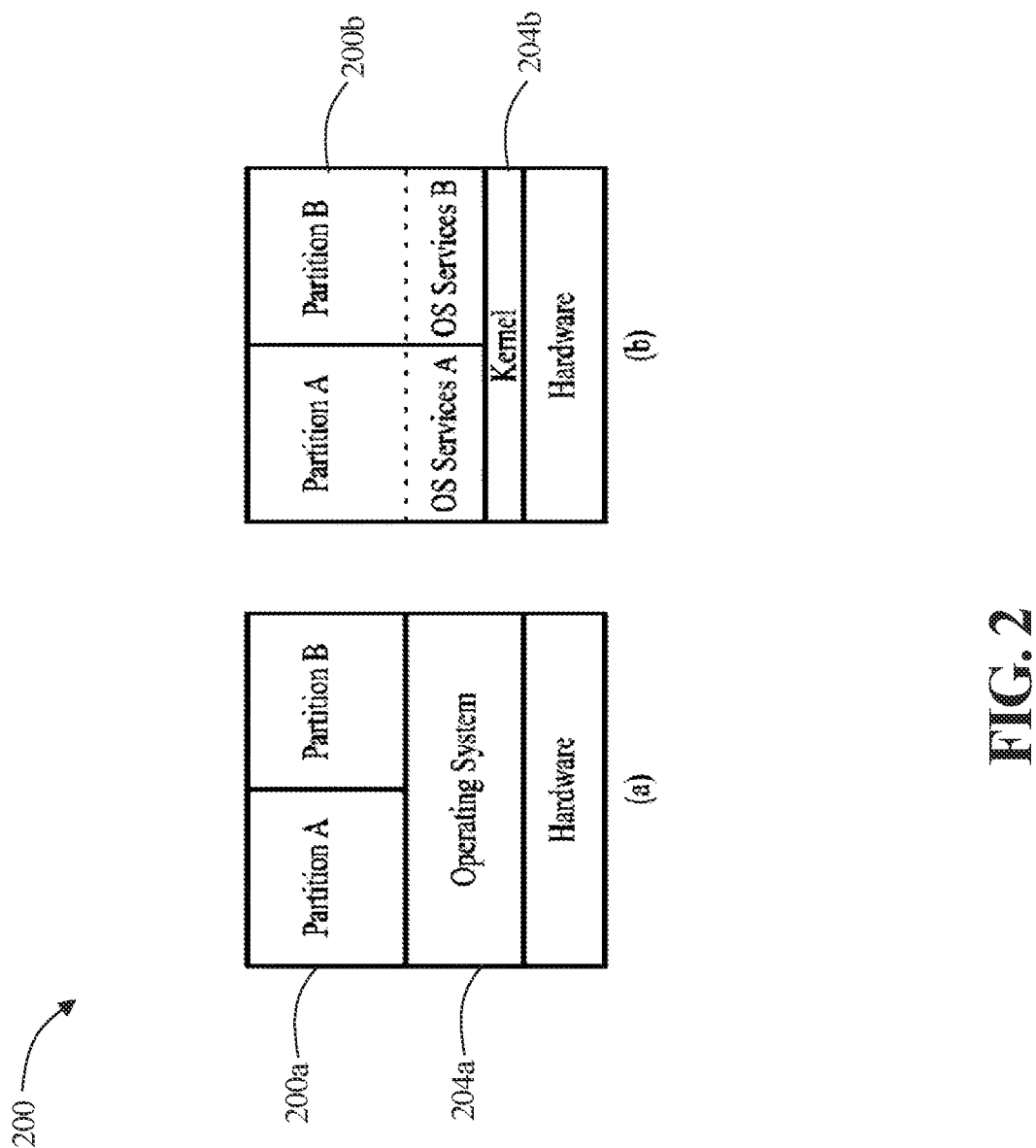
FIG. 2 is an exemplary of system infrastructures.

Referring now to FIG. 2, an exemplary embodiment of one or more system infrastructures 200 is described. 'System infrastructure" for the purposes of this disclosure refers to a structure in which memory and/or storage devices are partitioned for use in virtual machines. In first system infrastructure 200*a*, an operating system 204*a* may sit atop the physical hardware of a computing device. In one or more embodiments, the operating system 204*a* may provide the means to partition and/or allocate memory within the operating system for use in one or more virtual machines. In one or more embodiments, first system infrastructure 200*a* may allow for a single operating system to manage one or more partitions. In one or more embodiments, virtual machines with first system infrastructure 200*a* must rely on the dependability of the host operating system 204*a*. In one or more embodiments, a type 2 hypervisor as described in FIG. 1, may be used to create one or more virtual machines atop the operation system 204*a*. In second system infrastructure 200*b*, one or more operating systems may communicate directly with physical hardware. In contrast to first system structure 200*a* wherein one or more virtual machines must communicate with a host operating system 204*a* to receive resources, in second system infrastructure 200*b*, one or more virtual machines may communicate directly with the physical hardware of a computing device. In one or more embodiments, a kernel 204*b* may allocate resources to each operating system. In one or more embodiments, kernel may create a virtualization layer as described in FIG. 1 to generate virtualized devices and allocate the virtualized devices to each operating system. In one or more embodiments, a partition created within second system infrastructure may be independent of other operating systems operating on the computing device.

Figure 3:
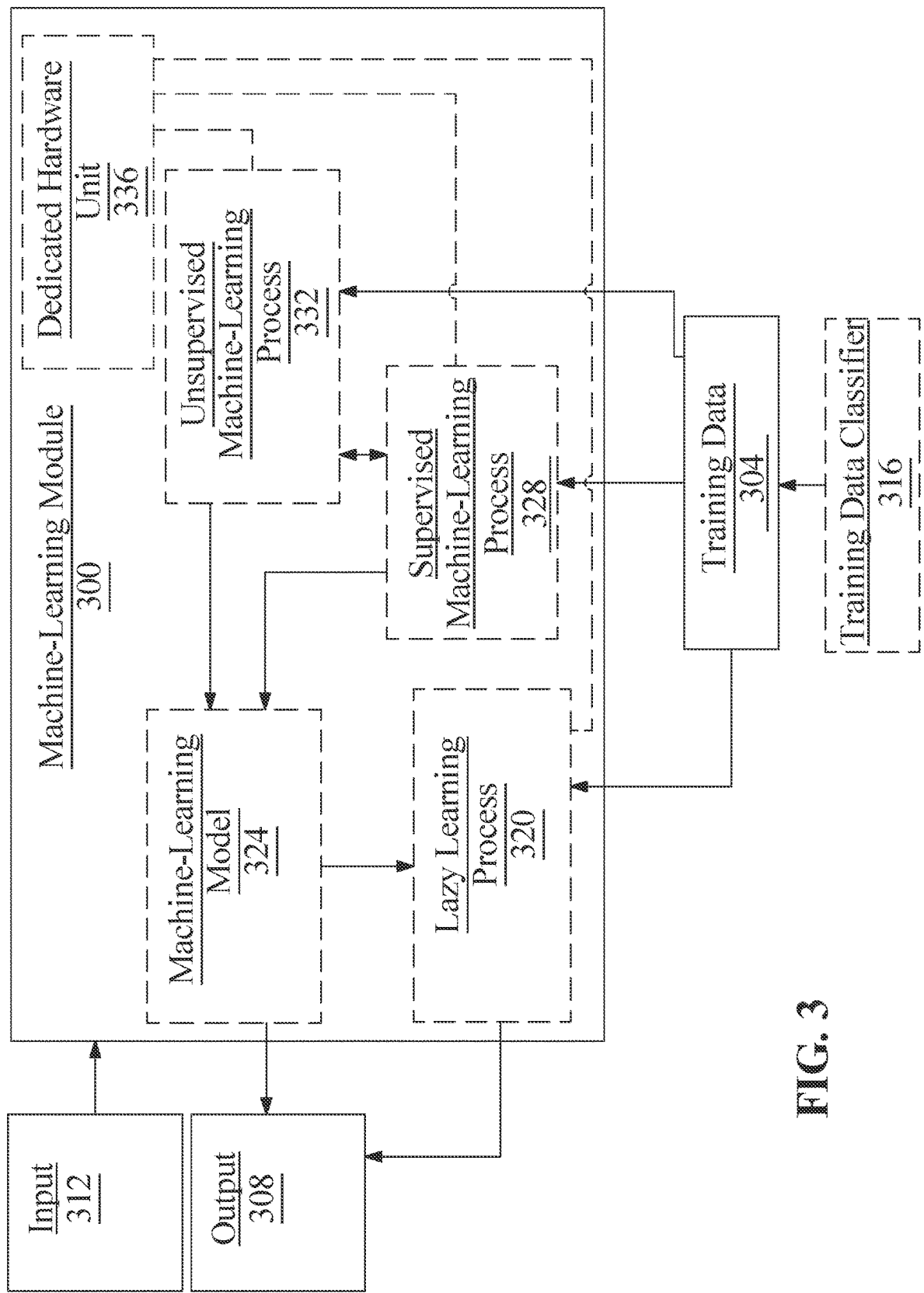
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include inputs generated by software module and outputs may include outputs of software module. In one or more embodiments, machine learning module 300 may be self-contained wherein software container may be portable. In one or more embodiment, training data and machine learning module 300 may be self-contained within software container as described in reference to FIG. 1. In one or more embodiments, training data within software container may be iteratively trained and saved within software container for future iterations. In one or more embodiments, a self-contained machine learning model may allow decreased vulnerability. In one or more embodiments, training data and/or machine learning models contained within a database may be compromised and create incorrect outputs.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to subclasses within software module.

Still referring to FIG. 3, computing device 304 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 304 may then calculate a likelihood table by calculating probabilities of different data entries and classification labels. Computing device 304 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device 304 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or another device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be. Processor may interpolate the low pixel count image to convert the 100 pixels into pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be. Processor may down-sample the high pixel count image to convert the 256 pixels into pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the 25$^{th}$ percentile value and the 50$^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 325. A "machine-learning model," as used in this disclosure, is a data structure representing and/or instantiating a mathematical and/or algorithmic representation of a relationship between inputs and outputs, as generated using any machine-learning process including without limitation any process as described above and stored in memory; an input is submitted to a machine-learning model 325 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 325 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs of software module as described above as inputs, outputs of software module as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 325 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
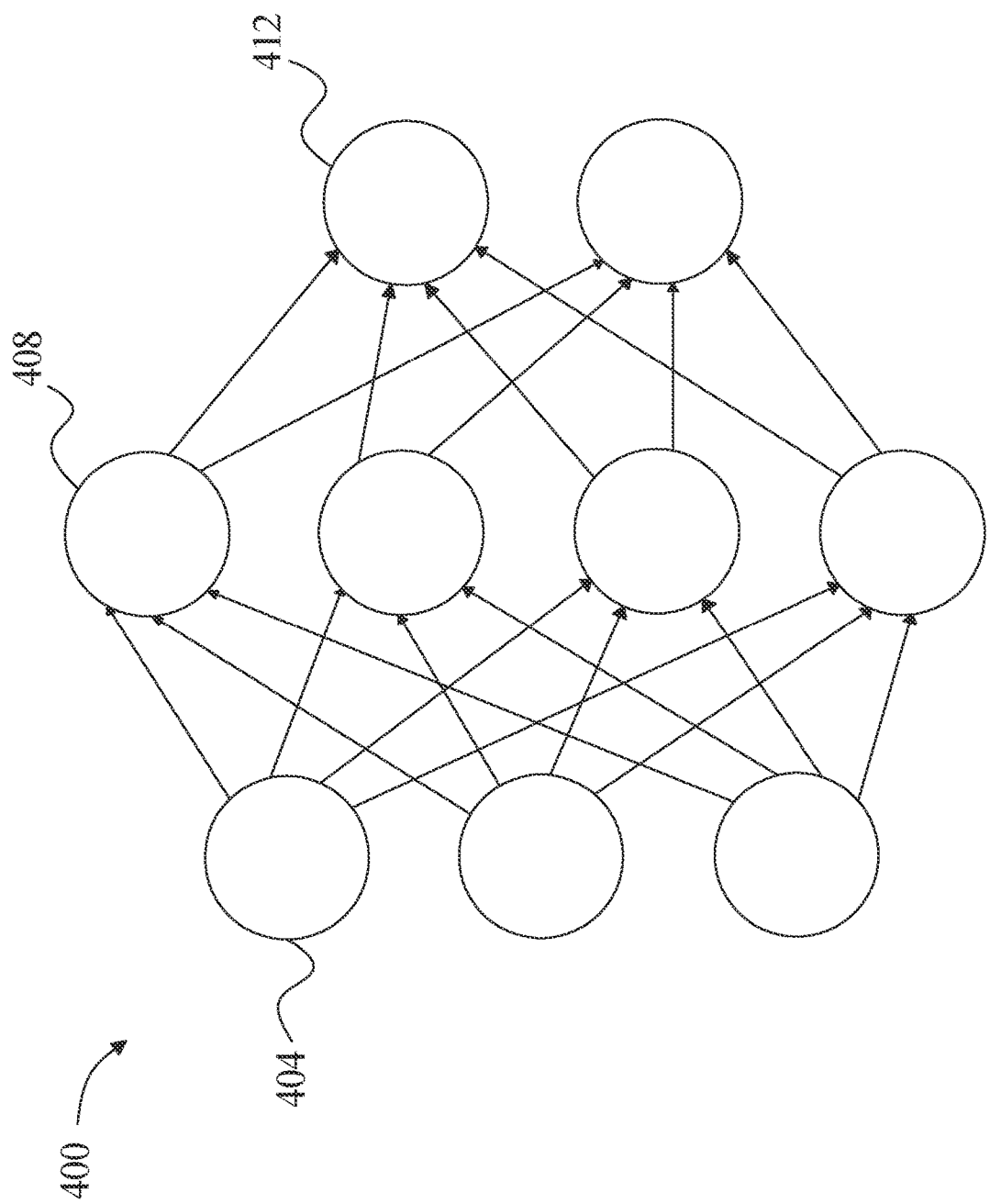
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
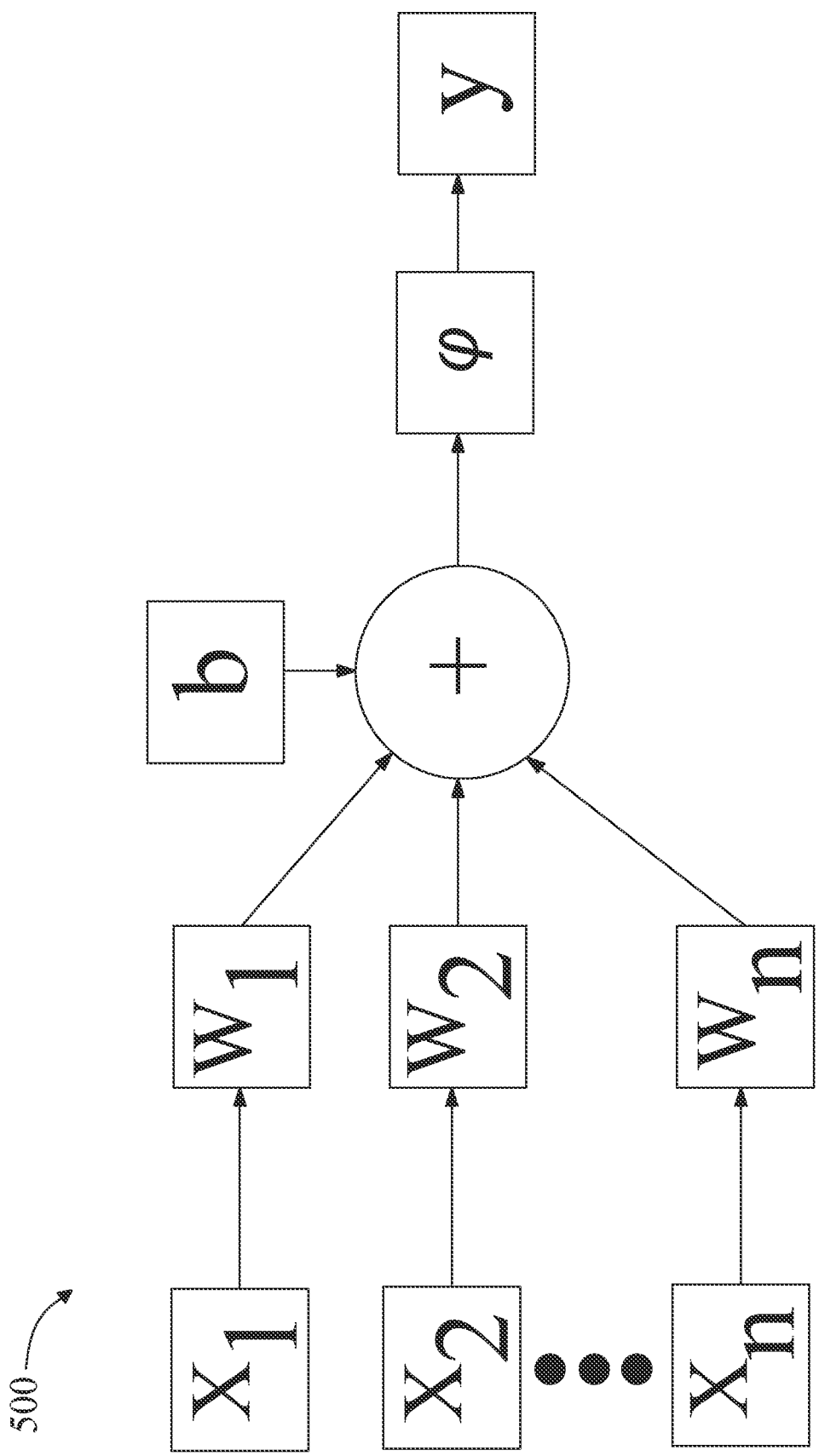
FIG. 5 is a block diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\Sigma_i x_i}$$

where the inputs to an instant layer are $x_i$, a swish function such as $f(x)=x^*$sigmoid (x), a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
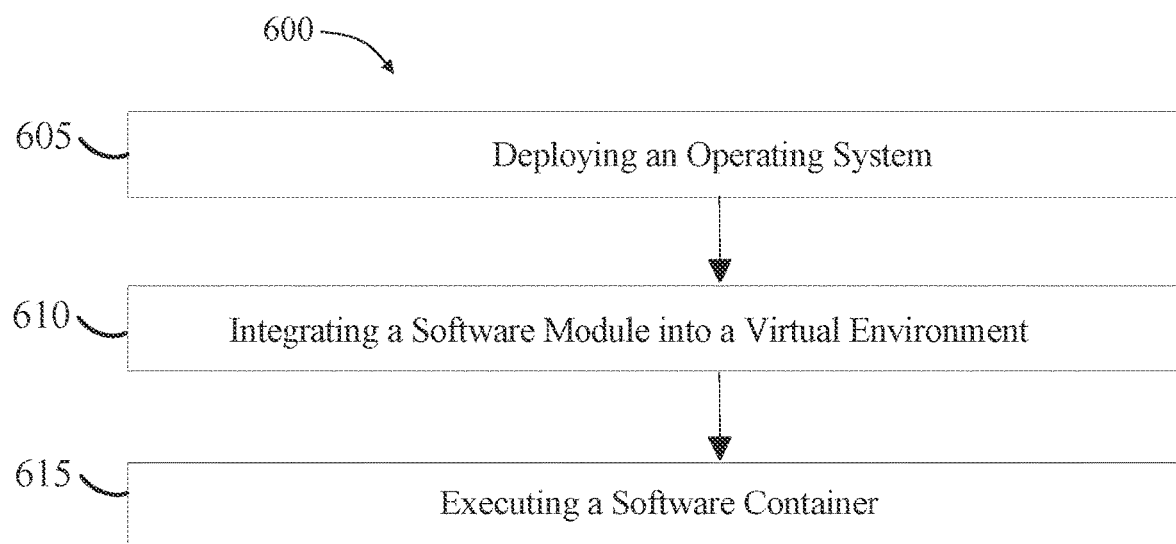
FIG. 6 is a flow diagram illustrating an exemplary embodiment of a method for providing a safety critical operating environment container architecture.

Referring now to FIG. 6, a non-limiting example of a method 600 of a mission critical operating environment container architecture is illustrated. At step 605, deploying, by at least a processor core of a plurality of processor cores communicatively connected to a memory, an operating system on the computing device; this may be implemented, without limitation, as described above in reference to FIGS. 1-5. Operating system may be configured to receive a software module to be executed on the at least one multi-core processor. Operating system may be configured to determine an initial resource allocation for the software model, wherein the initial resource allocation includes a memory allocation. Initial resource allocation may include a core allocation. Core allocation may include at least a first core in a first processor and at least a second core in a second processor. Determining initial resource allocation may include identifying a maximal performance requirement and determining the initial resource allocation based on the maximal performance requirement. Determining initial resource allocation may include identifying a redundancy requirement and determining the initial resource allocation based on the maximal performance requirement. Operating system may be configured to create a virtual environment for the at least a software module. Creating virtual environment may include generating a virtualization layer and allocating a memory space through the virtualization layer in the memory according to the memory allocation. At least a processor core and/or operating system may be configured to provide virtual environment with direct access to one or more physical hardware components of at least a computing device. Deployment of operating system may include performing an attested boot of the operating system.

At step 610, at least a processor core integrates software module into the environment by instantiating software module into at least one software container, wherein the at least one software container comprises a plurality of dedicated software packages; this may be implemented, without limitation, as described above in reference to FIGS. 1-5.

At step 615, at least a processor core executes the software container; this may be implemented, without limitation, as described above in reference to FIGS. 1-5. The software module may include a machine learning model; the machine learning model may be configured to operate independently of a data source connection. In an embodiment, each virtual environment may be connected to one or more physical devices of the computing device through a virtual binary unit apparatus (BUS) adapter.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
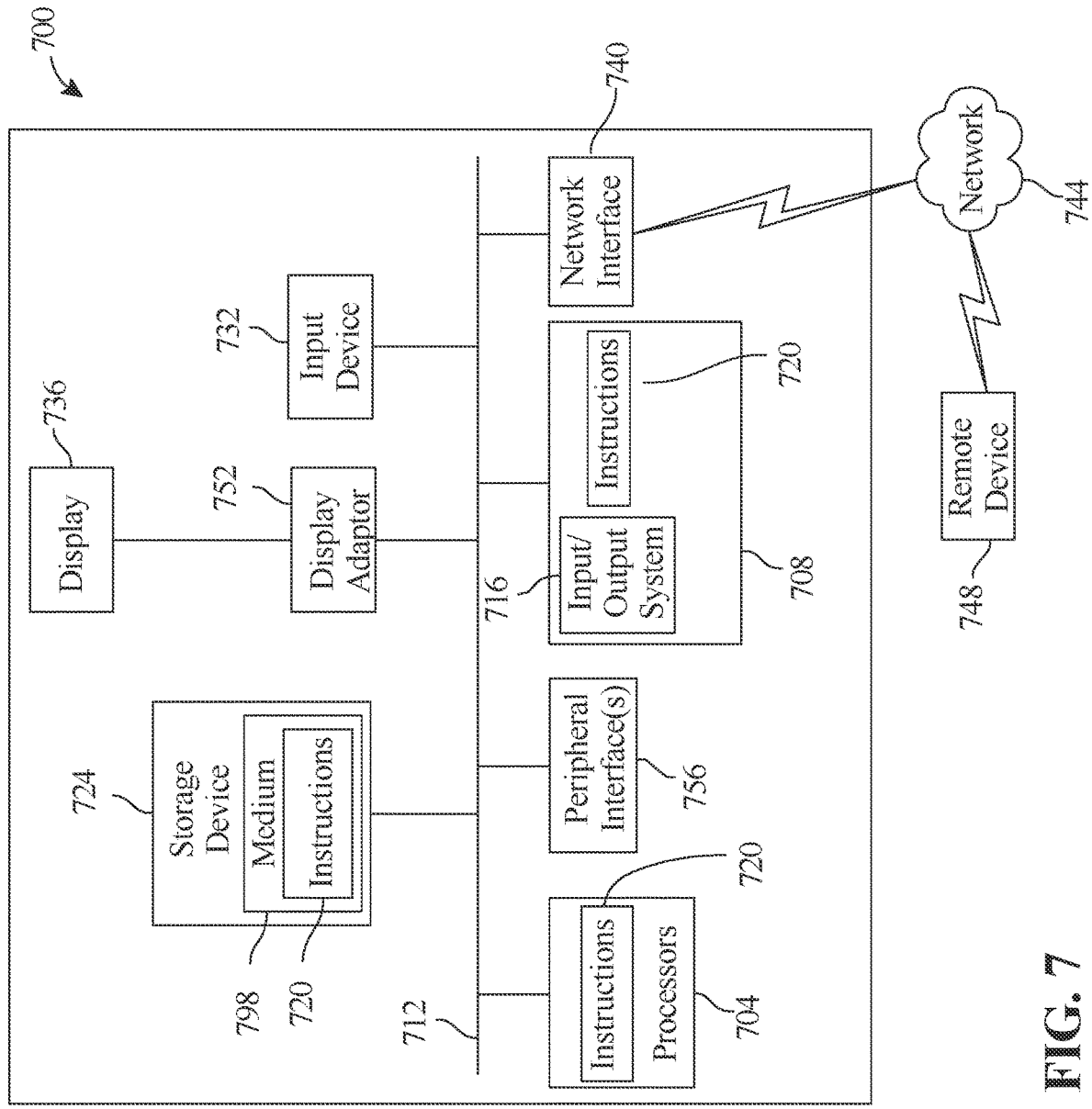
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus having a mission critical operating environment container architecture, the apparatus comprising:
   a plurality of processor cores incorporated in at least a computing device; and
   a memory communicatively connected to the plurality of processor cores, the memory containing instructions configuring at least a core of the plurality of processor cores to:
   deploy an operating system on the computing device, the operating system configured to:
   receive a software module to be executed on the plurality of processor cores;
   determine an initial resource allocation for the software module, wherein the initial resource allocation includes a memory allocation as a function of a probable performance requirement;
   create a virtual environment for the software module, wherein creating the virtual environment further comprises:
   generating one or more virtualization layers supervised by a hypervisor, wherein a host operating system within the virtual environment is operated by the one or more virtualization layers; and
   allocating a memory space through the virtualization layer in the memory according to the memory allocation, wherein allocating the memory space further comprises partitioning the memory into a root partition and one or more child partitions, wherein the memory is further split into one or more partitions, wherein each partition of the one or more partitions is configured for a storage task of a plurality of storage tasks, and wherein each storage task of the plurality of storage tasks is unique;
   wherein deployment of the operating system further comprises performing an attested boot of the operating system, wherein the attested boot comprises verifying a digital signature associated with the operating system to ensure that it has not been tampered with;
   integrate the software module into the virtual environment by instantiating the software module into at least one software container, wherein the at least one software container comprises a plurality of dedicated software packages; and
   execute the container.

2. The apparatus of claim 1, wherein the initial resource allocation further comprises a core allocation.

3. The apparatus of claim 2, wherein the core allocation includes at least a first core in a first processor and at least a second core in a second processor.

4. The apparatus of claim 1, wherein determining the initial resource allocation includes:
identifying a maximal performance requirement; and
determining the initial resource allocation based on the maximal performance requirement.

5. The apparatus of claim 1, wherein determining the initial resource allocation includes:
identifying a redundancy requirement; and
determining the initial resource allocation based on the redundancy requirement.

6. The apparatus of claim 1, further configured to provide the virtual environment with direct access to one or more physical hardware components of the at least a computing device.

7. The apparatus of claim 1, wherein the software module comprises a machine learning model, wherein the machine learning model is configured to operate independently of a data source connection.

8. The apparatus of claim 1, wherein each virtual environment is connected to one or more physical devices of the computing device through a virtual binary unit apparatus (BUS) adapter.

9. The apparatus of claim 1, further configured to:
modify the resource allocation; and
update the virtual environment based on the modified resource allocation.

10. A method of providing a mission critical operating environment container architecture, the method comprising:
deploying, by at least a processor core of a plurality of processor cores communicatively connected to a memory, an operating system on a computing device, the operating system configured to:
receive a software module to be executed on the plurality of processors;
determine an initial resource allocation for the software module, wherein the initial resource allocation includes a memory allocation as a function of a probable performance requirement;
create a virtual environment for the software module, wherein creating the virtual environment further comprises:
generating one or more virtualization layers, supervised by a hypervisor, wherein a host operating system within the virtual environment is operated by the one or more virtualization layers; and
allocating a memory space through the virtualization layer in the memory according to the memory allocation, wherein allocating the memory space further comprises partitioning the memory into a root partition and one or more child partitions, wherein the memory is further split into one or more partitions, wherein each partition of the one or more partitions is configured for a storage task of a plurality of storage tasks, and wherein each storage task of the plurality of storage tasks is unique;
wherein deployment of the operating system further comprises performing an attested boot of the operating system, wherein the attested boot comprises verifying a digital signature associated with the operating system to ensure that it has not been tampered with;
integrating, by the at least a processor core the software module into the virtual environment by instantiating the software module into at least one software container, wherein the at least one software container comprises a plurality of dedicated software packages; and
executing, by the at least a processor core, the software container.

11. The method of claim 10, wherein the initial resource allocation further comprises a core allocation.

12. The method of claim 11, wherein the core allocation includes at least a first core in a first processor and at least a second core in a second processor.

13. The method of claim 10, wherein determining the initial resource allocation includes:
identifying a maximal performance requirement; and
determining the initial resource allocation based on the maximal performance requirement.

14. The method of claim 10, wherein determining the initial resource allocation includes:
identifying a redundancy requirement; and
determining the initial resource allocation based on the redundancy requirement.

15. The method of claim 10 further comprising to providing the virtual environment with direct access to one or more physical hardware components of the at least a computing device.

16. The method of claim 10, wherein the software module comprises a machine learning model, wherein the machine learning model is configured to operate independently of a data source connection.

17. The method of claim 10, wherein each virtual environment is connected to one or more physical devices of the computing device through a virtual binary unit apparatus (BUS) adapter.

18. The method of claim 10, comprising:
modifying the resource allocation; and
updating the virtual environment based on the modified resource allocation.

* * * * *